United States Patent
Abe

(10) Patent No.: US 10,465,068 B2
(45) Date of Patent: Nov. 5, 2019

(54) ARTICLE COMPRISING PLATED COMPONENT

(71) Applicant: TECHNO POLYMER CO., LTD., Tokyo (JP)

(72) Inventor: Fumiaki Abe, Tokyo (JP)

(73) Assignee: TECHNO POLYMER CO., LTD., Tokyo (JP)

( * ) Notice: Subject to any disclaimer, the term of this patent is extended or adjusted under 35 U.S.C. 154(b) by 113 days.

(21) Appl. No.: 15/549,956

(22) PCT Filed: Feb. 10, 2016

(86) PCT No.: PCT/JP2016/053892
§ 371 (c)(1),
(2) Date: Aug. 9, 2017

(87) PCT Pub. No.: WO2016/129617
PCT Pub. Date: Aug. 18, 2016

(65) Prior Publication Data
US 2018/0030262 A1    Feb. 1, 2018

(30) Foreign Application Priority Data
Feb. 10, 2015   (JP) .................................. 2015-024658

(51) Int. Cl.
| | | |
|---|---|---|
| C08L 51/00 | (2006.01) | |
| C08L 51/06 | (2006.01) | |
| B29C 45/00 | (2006.01) | |
| C08L 83/04 | (2006.01) | |
| C08L 91/06 | (2006.01) | |
| C08L 101/00 | (2006.01) | |
| B29C 65/58 | (2006.01) | |
| B29C 65/00 | (2006.01) | |
| B29B 9/06 | (2006.01) | |
| B29K 23/00 | (2006.01) | |
| C23C 18/16 | (2006.01) | |
| F16B 5/06 | (2006.01) | |
| F16B 21/08 | (2006.01) | |

(52) U.S. Cl.
CPC .............. *C08L 51/06* (2013.01); *B29C 45/00* (2013.01); *B29C 65/58* (2013.01); *B29C 66/474* (2013.01); *B29C 66/71* (2013.01); *B29C 66/72321* (2013.01); *B29C 66/731* (2013.01); *B29C 66/7392* (2013.01); *C08L 51/00* (2013.01); *C08L 51/003* (2013.01); *C08L 83/04* (2013.01); *C08L 91/06* (2013.01); *C08L 101/00* (2013.01); *B29B 9/06* (2013.01); *B29C 45/0001* (2013.01); *B29K 2023/12* (2013.01); *B29K 2995/0001* (2013.01); *C23C 18/1641* (2013.01); *F16B 5/0614* (2013.01); *F16B 21/086* (2013.01); *F16B 21/088* (2013.01)

(58) Field of Classification Search
CPC ........... C08L 51/06; C08L 51/003; B29B 9/06
See application file for complete search history.

(56) References Cited

FOREIGN PATENT DOCUMENTS

| | | | |
|---|---|---|---|
| CN | 103108915 A | 5/2015 | |
| EP | 2752454 A1 | 7/2014 | |
| JP | 2006/183791 A | 7/2006 | |
| JP | 2009/67970 A | 4/2009 | |
| JP | 2014-107170 A | 6/2014 | |
| JP | 2014-141671 A | 8/2014 | |
| JP | 2014141670 A | 8/2014 | |
| JP | 2014-227091 | * 12/2014 | ............... B60H 1/00 |
| JP | 2014-227091 A | 12/2014 | |
| JP | 2015-169063 A | 9/2015 | |
| WO | 2014/175332 A1 | 10/2014 | |

OTHER PUBLICATIONS

International Preliminary Report on Patentability and Written Opinion for application No. PCT/JP2016/053892 dated Apr. 19, 2016.
European Search Report for application No. EP16749260 dated Jun. 7, 2018.
International Search Report for corresponding PCT/JP2016/053892, dated Apr. 19, 2016.

* cited by examiner

*Primary Examiner* — Robert D Harlan
(74) *Attorney, Agent, or Firm* — Lando & Anastasi, LLP

(57) ABSTRACT

An article at least comprising two components contacting with each other, in which at least part of a surface of at least one of the two components being plated, is provided, which is excellent in plating adhesion and impact resistance and thus is hard to be damaged on the plated surface and excellent in appearance even when one of the two components is brought into contact with the plated part of the other component, and is preferably suppressed in occurrence of unpleasant sounds such as squeaking noise. At least one of the two components of the article is formed of a thermoplastic resin composition (X) comprising a rubber-reinforced aromatic vinyl resin (A) in at least part of the portion that contacts the plated portion of the other component.

19 Claims, 7 Drawing Sheets

ARTICLE COMPRISING PLATED COMPONENT

CROSS-REFERENCE TO RELATED APPLICATIONS

This application is a U.S. National Stage Entry and claims priority under 35 U.S.C. § 371 to International Application Serial No. PCT/JP2016/053892, filed Feb. 10, 2016, titled "ARTICLE COMPRISING PLATED COMPONENT," which claims priority to Japanese Patent Application No. JP2015-024658, filed Feb. 10, 2015, the contents of each of which are herein incorporated by reference in their entirety for all purposes.

TECHNICAL FIELD

The present invention relates to an article which at least comprises two components contacting with each other, wherein at least part of the surface of at least one of the two components is plated, and is excellent in impact resistance and appearance and is further prevented from occurrence of unpleasant sounds such as squeaking noise even when one of the two components contacts with a plated part of the other component.

BACKGROUND ART

Recently, resin molded products are widely used as components of various products such as vehicles, electric/electronic equipment, office automation (OA) equipment, household electrical appliances, building materials, sanitary goods and the like. These products are usually composed of assemblies of a plurality of parts, and these parts are often arranged adjacent to each other or in contact with each other by fitting, abutting, overlapping, fastening with a screw or the like. Snap-fit structure is known as one of the modes of obtaining such assemblies (Patent Document 1), but is problematic in that resinous nail portions are often broken if the parts constituted by molded articles are insufficient in impact resistance.

Further, it is known that the above-mentioned assemblies generate squeaking noise (rubbing noise) when the adjacent parts are dynamically contacted with and rubbed against each other by the action of vibration, rotation, twisting, sliding, impact and the like. For example, squeaking noise may occur due to rubbing of a blowing outlet of an air conditioner or audio housing part disposed in an automobile against a part fitted in the periphery or inside thereof due to vibration or the like. The above-mentioned squeaking noise is known as unpleasant sound caused by the stick-slip phenomenon generated when two objects are rubbed against each other, and thus is caused by a property different from slidability of resins.

Also, in recent years, superior appearance is demanded for products in the field of vehicles, OA equipment, precision equipment, household electrical appliances, furniture, daily necessaries, toys, etc., from the viewpoint of high quality and differentiation. Thus, thermoplastic resinous parts adapted to the products in these fields are required to be excellent in appearance. Plating is known as a method for giving an excellent appearance to a thermoplastic resinous part. However, there is a problem such that when the plated resinous parts are used in association with each other, scratching or peeling may occur in sites where the plated surfaces come into contact with each other, so that appearance may be impaired, or the above-mentioned squeaking noise may occur.

The stick-slip phenomenon is understood as a phenomenon in which frictional force largely varies periodically as illustrated in FIG. 11; and more specifically, it is generated as illustrated in FIG. 12. That is, when an object M connected with a spring is placed on a driving table that moves at a driving speed V, as illustrated by a model of FIG. 12($a$), the object M moves toward the right direction first as illustrated in FIG. 12($b$) together with the table moving at the driving speed V by the action of a static frictional force. When the spring force by which the object M is to be restored to its original position becomes equal to the static frictional force, the object M starts to slip in the opposite direction to the driving speed V. At this time, the object M comes to receive a kinematic frictional force, and the slip is stopped when the force of the spring becomes equal to the kinematic frictional force as illustrated in FIG. 12($c$), so that the object M comes again into a state where it attaches on the driving table and it moves again in the same direction as the driving speed V (FIG. 12($d$)). This is called a stick slip phenomenon, and it has been argued that, as illustrated in FIG. 11, if the difference $\Delta\mu$ between the coefficient of static friction $\mu s$ and the lower end of a saw wavy form $\mu l$ is large, squeaking noises tend to be generated easily. Meanwhile, a dynamic friction coefficient is a middle value between $\mu s$ and $\mu l$. Therefore, even when the absolute value of the static friction coefficient is low, squeaking noise becomes liable to occur, if the $\Delta\mu$ is large. Such squeaking noise becomes a main cause for impairing comfortableness and quietness inside and outside the automobile cabin or inside the office or house room, and reduction of squeaking noise is strongly demanded.

Conventionally, it is known that a rubber-reinforced aromatic vinyl resin reinforced with a crystalline rubber such as an ethylene/alpha-olefin rubber is used as a molding material to prevent molded articles from generating squeaking noise (refer to Patent Document 2 and Patent Document 3). However, the molded articles obtained from the above molding material is inferior in platability and is still insufficient in appearance, compared with rubber-reinforced aromatic vinyl resins reinforced with diene rubbers such ABS resins.

Conventionally, it is known that a predetermined amount of a polypropylene resin is blended to obtain an alloy so as to improve the platability of the rubber-reinforced aromatic vinyl resin reinforced with a non-diene rubber (Patent document 4). However, it is found that when an article is constituted by assembling a plurality of parts which are molded products made from the above alloy and plated, the plated surfaces of these parts are hurt or generate unpleasant sounds such as squeaking noise in the case where the plated surfaces contact with each other.

CONVENTIONAL TECHNICAL REFERENCES

Patent Documents

Patent Document 1: Japanese Patent Laid-Open (Kokai) No. 2006-278574
Patent Document 2: Japanese Patent Laid-Open (Kokai) No. 2013-112812
Patent Document 3: International Publication No. WO 2013/031946

Patent Document 4: Japanese Patent Laid-Open (Kokai) No. 2008-150593

SUMMARY OF INVENTION

Problems to be Solved by Invention

The object of the present invention is to provide an article which at least comprises two components contacting with each other, at least part of a surface of at least one of the two components being plated, and which is excellent in plating adhesion and impact strength and is thus hard to be damaged on the plated surface and excellent in appearance, and is preferably prevented from occurrence of unpleasant sounds such as squeaking noise, even when one of the two components contacts with a plated portion, particularly, a plated surface of the other component.

Means for Solving the Problems

The present inventors have conducted intensive studies in order to solve the above problems and consequently have found that the above object can be achieved by using a specific thermoplastic resin (X) to form at least part of the portion of the other component that contacts with the plated portion of the one component in the above-mentioned article. Thus, the present invention has been completed.

Thus, according to one aspect of the present invention, there is provided an article at least comprising two components contacting with each other, at least part of a surface of each of the two components being plated, in which at least one of the two component comprises a portion which contacts with the plated portion of the other component, said portion being at least partly formed of a thermoplastic resin composition (X) comprising a rubber-reinforced aromatic vinyl resin (A).

Further, according to another aspect of the present invention, there is provided a component for constituting an article that at least comprises two components contacting with each other, at least part of a surface of each of the two components being plated, in which said component constituting the article comprises a portion which contacts with the plated portion of the other component, said portion being at least partly formed of a thermoplastic resin composition (X) comprising a rubber-reinforced aromatic vinyl resin (A).

Further, according to still another aspect of the present invention, there is provided an article at least comprising two components contacting with each other, at least part of a surface of one of the two components being plated, in which the other of the two components comprises a portion that contacts with the plated portion of the one component, said portion being at least partly formed of a thermoplastic resin composition (X) comprising a rubber-reinforced aromatic vinyl resin (A), and a noise risk of said thermoplastic resin composition (X) being 3 or less. Herein, the noise risk means one measured by rubbing three times with an amplitude of 20 mm using a stick-slip tester SSP-02 manufactured by ZINS Ziegler-Instruments GmbH, under the conditions of a temperature of 23° C., a humidity of 50% RH, a load of 5 N to 40 N and a velocity of 1 mm/sec to 10 mm/sec.

Further, according to still another aspect of the present invention, there is provided a component for constituting an article that at least comprises two components contacting with each other, at least part of a surface of one of the two components being plated, in which said component constituting the article comprises a portion which contacts with the plated portion of the one component, said portion being at least partly formed of a thermoplastic resin composition (X) comprising a rubber-reinforced aromatic vinyl resin (A), and a noise risk of said thermoplastic resin composition (X) being 3 or less.

Effect of Invention

According to the present invention, an article comprising at least two components that each have a surface at least partly plated is provided in which a portion of one component which contacts with a plated portion of the other component is at least partly formed of a specific thermoplastic resin composition (X), and thus the plated surfaces of the two components are prevented from directly contacting with each other, and also the plated portion of the other component is brought in contact with the portion formed of the specific thermoplastic resin composition (X) of the one component. Thus, even when the two components are brought into contact with each other, the plated portion is prevented from being hurt by virtue of excellent impact resistance whilst appearance is kept good, and in the preferred embodiment of the present invention, occurrence of unpleasant sounds such as squeaking noise can further be prevented. Since the above-mentioned thermoplastic resin composition (X) is excellent in plating adhesion, not only occurrence of unpleasant sounds such as squeaking noise can be prevented but also plating adhesion of the components can be kept good in case the two components are formed of the above-mentioned thermoplastic resin (X) in their entirety or at the whole or part of a portion where the two components contact with each other.

According to the present invention, an article (plated article) at lease comprising two components that contact with each other is also provided in which one of the two components has a surface at least partly plated whilst the other component contacting with a plated portion of the one component is not plated but formed of a thermoplastic resin composition (X) which comprises a rubber-reinforced aromatic vinyl resin (A) and exhibits a noise risk of 3 or less. Thus, even when the two components are brought into contact with each other, the plated portion is prevented from being hurt by virtue of excellent impact resistance whilst appearance is kept good, and occurrence of unpleasant sounds such as squeaking noise can further be prevented. In the preferred embodiment of the present invention, since weatherability and gloss are further made excellent, a molded material suitable for exterior parts is provided. Since the above-mentioned thermoplastic resin composition (X) is excellent in plating adhesion as well, the above-mentioned two components may be both formed of the above-mentioned thermoplastic resin composition (X).

BRIEF DESCRIPTION OF DRAWINGS

FIG. 13b is a perspective view of the test piece of FIG. 13a.

DESCRIPTION OF EMBODIMENTS

Hereinafter, the present invention will be described in detail.

In the present invention, "(co)polymer" means homopolymer and/or copolymer; "(meth)acryl" means acryl and/or methacryl; and "(meth)acrylate" means acrylate and/or methacrylate.

Further, the melting point (which is sometimes written as "Tm" in the present specification) measured according to JIS K7121-1987 means a value read from a peak temperature in an endothermic pattern acquired by measurement of endothermic change at a constant temperature-rise rate of 20° C. per 1 min by using DSC (differential scanning calorimeter).

1. The Present Article

The present article at least comprises two components which contact with each other, and at least one of the above two components has a surface which is at least partly plated whilst the other of the above two components has a portion which is brought into contact with the plated portion of the one component and is at least partly formed of the above-mentioned thermoplastic resin (X). In other words, the present article at least comprises a first component and a second component which contact with each other, in which the first component may or may not be plated, and the second component has a surface which is at least partly plated, and the first component has a portion (particularly, an end surface of the first component) which is brought into contact with a plated portion (particularly, a plated surface) of the second component and only has to be at least partly formed of the above-mentioned thermoplastic resin (X). In particular, it is preferable that the first component is preferably formed of the above-mentioned thermoplastic resin composition (X) in its entirety or at the whole or part of a portion (particularly, an end surface of the first component) which is brought into contact with a plated portion (particularly, a plated surface) of the second component. The arrangement of the present invention only requires the first and second components to contact with each other as described above, and particularly can be used suitably in an article in which the components contact with each other by way of convex-concavo portions utilizing snap-fit, screwing or the like.

Figure 1:
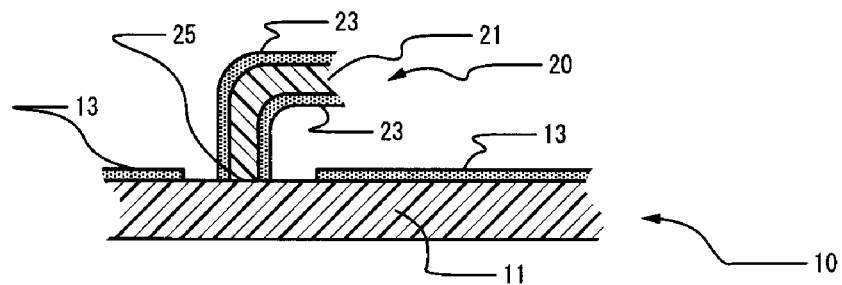
FIG. 1 is a cross-sectional view illustrating one mode of an article according to the present invention.

As an example of the present article, mention may be made of an article which, as shown in FIG. 1, is constituted by a first component 10 composed of a resinous molded article 11 which is provided on one surface thereof with plating 13 intermittently and a second component 20 composed of a resinous molded article 21 which is provided with plating 23 on its entire surface except a contact portion (end surface) 25. In the article of FIG. 1, the contact portion (end surface) 25 and its plating 23 of the second component 20 are brought into contact with a non-plated portion of the intermittently-plated surface of the first component 10. When the resinous molded article 11 of the first component 10 is formed of the thermoplastic resin composition (X) according to the present invention, occurrence of unpleasant sounds such as squeaking noise is suppressed even if the two components dynamically contact with each other. Meanwhile, the resinous molded article 21 of the second component 20 may also be formed of the thermoplastic resin composition (X).

Figure 2:
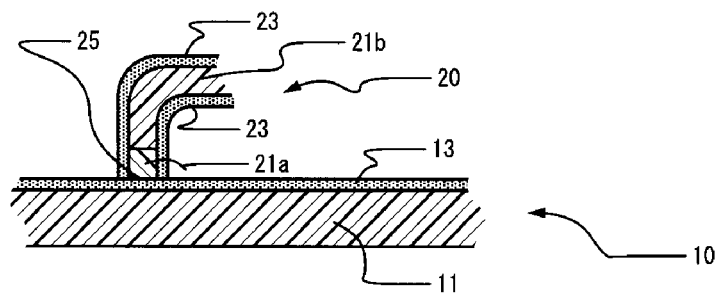
FIG. 2 is a cross-sectional view illustrating another mode of an article according to the present invention.

As another example of the present article, mention may be made of an article which, as shown in FIG. 2, is constituted by a first component 10 composed of a resinous molded article 11 which is provided with plating 13 on one surface thereof in its entirety and a second component 20 composed of resinous molded articles 21a, 21b, which is provided with plating 23 on its entire surface except the contact portion (end surface) 25. In the article of FIG. 2, the contact portion (end surface) 25 and its plating 23 of the second component 20 are brought into contact with the plated surface of the first component 10. When the molded article portion 21a of the contact portion (end surface) 25 is formed of the thermoplastic resin composition (X) according to the present invention, occurrence of unpleasant sounds such as squeaking noise is suppressed even if the two components dynamically contact with each other. Meanwhile, besides the portion 21a, the portion 21b of the resinous molded article of the second component 20 may also be formed of the thermoplastic resin composition (X). In other words, the whole of the resinous molded articles 21a, 21b of the second component 20 may be formed of the thermoplastic resin composition (X).

Compared with the embodiment of FIG. 1, the embodiment of FIG. 2 is easier to produce since the surface of the first component 10 with which the second component 20 contacts can be entirely plated, and is also preferred from the viewpoint of design since no non-plated portion appears on the exterior of the article.

Figure 3:
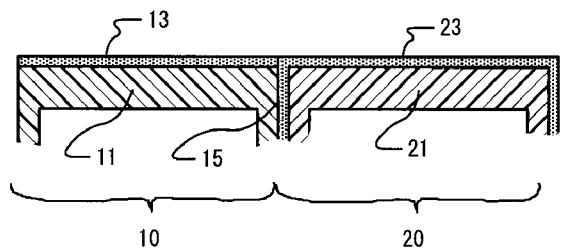
FIG. 3 is a cross-sectional view illustrating another mode of an article according to the present invention.

As another example of the present article, mention may be made of an article which, as shown in FIG. 3, is constituted by a first component 10 composed of a resinous molded article 11 which is provided on only the upper surface thereof with plating 13 and a second component 20 composed of a resinous molded article 21 which is provided on the upper surface and both side surfaces thereof with plating 23. In the article of FIG. 3, the contact surface (side surface) 15 and its plating 13 of the first component 10 abut against the plated side surface of the second component 20. When the resinous molded article 11 of the first component 10 is formed of the thermoplastic resin composition (X) according to the present invention, occurrence of unpleasant sounds such as squeaking noise is suppressed even if the two components dynamically contact with each other. Meanwhile, the resinous molded article 21 of the second component 20 may also be formed of the thermoplastic resin composition (X).

Figure 4:
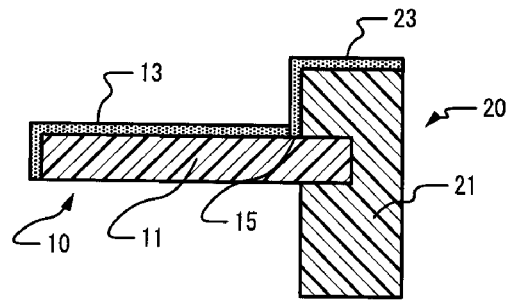
FIG. 4 is a cross-sectional view illustrating another mode of an article according to the present invention.

As another example of the present article, mention may be made of an article which, as shown in FIG. 4, is obtained by fitting an end of a resinous molded article 11 in a complementary hole formed on a side surface of a resinous molded article 21, and providing plating 13 and 23 on only the upper surfaces of the resulting assembly. In the article of FIG. 4, the plating 23 present on the side surface of the resinous molded article 21 contacts with the upper surface of the resinous molded article 11 at its contact portion (adjacent portion) 15 with the resinous molded article 21. Normally, the thickness of the plating is thin, and thus when the resinous molded article 11 is formed of the thermoplastic resin composition (X) according to the present invention, occurrence of unpleasant sounds such as squeaking noise is suppressed even if the two molded articles dynamically contact with each other. Meanwhile, the resinous molded article 21 of the second component 20 may also be formed of the thermoplastic resin composition (X).

Figure 5:
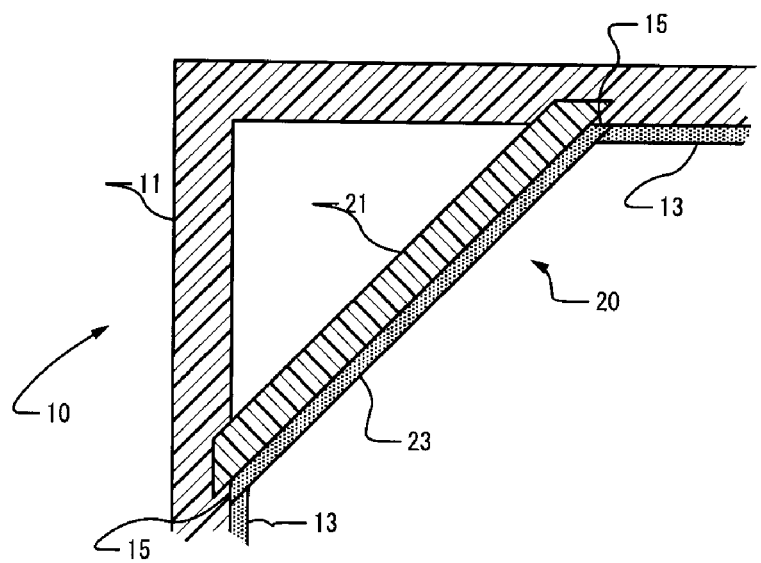
FIG. 5 is a cross-sectional view illustrating another mode of an article according to the present invention.

As another example of the present article, mention may be made of an article which, as shown in FIG. 5, is constituted by a first component 10 composed of a resinous molded article 11 which is L-shaped in cross section and a second component 20 composed of a plate-like resinous molded article 21 which bridges over the corner portion of the first component 10. The resinous molded article 21 is fixed by fitting both end portions thereof in the respective complementary holes. Plating 13, 23 is provided on the inner surfaces of the two resinous molded articles. In the article of FIG. 5, like the article of FIG. 4, the plating 23 of the resinous molded article 21 contacts with the contact portion (adjacent portion) 15 of the resinous molded article 11 with the resinous molded article 21. When the resinous molded article 11 is formed of the thermoplastic resin composition (X) according to the present invention, occurrence of unpleasant sounds such as squeaking noise is suppressed even if the two molded articles dynamically contact with each other. Meanwhile, the resinous molded article 21 of the second component 20 may also be formed of the thermoplastic resin composition (X).

Figure 6:
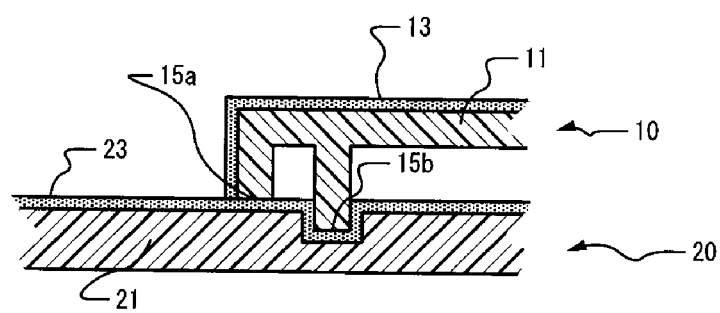
FIG. 6 is a cross-sectional view illustrating another mode of an article according to the present invention.

As another example of the present article, mention may be made of an article which, as shown in FIG. 6, is constituted by a first component 10 composed of a resinous molded article 11 which has two leg portions and is plated on the upper and side surfaces thereof and a resinous molded article 21 which is plated on the upper surface thereof and has a recess complementary to one of the leg portions of the first component 10. In the article of FIG. 6, the end surface of one contact portion (leg portion) 15a of the resinous molded article 11 and its plating 13 abut against the plating 23 of the resinous molded article 21, and the other contact portion (leg portion) 15b fits in the recess and contacts the plating 23 there. When the resinous molded article 11 is formed of the thermoplastic resin composition (X) according to the present invention, occurrence of unpleasant sounds such as squeaking noise is suppressed even if the two molded articles dynamically contact with each other. Meanwhile, the resinous molded article 21 of the second component 20 may also be formed of the thermoplastic resin composition (X).

Figure 7:
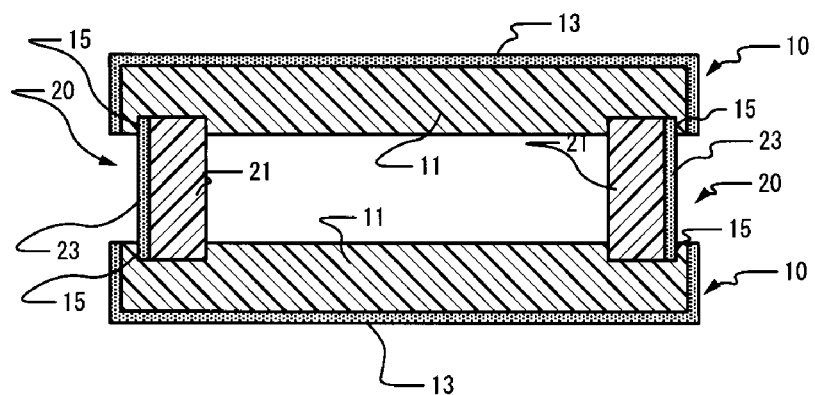
FIG. 7 is a cross-sectional view illustrating another mode of an article according to the present invention.

As another example of the present article, mention may be made of an article which, as shown in FIG. 7, is constituted by two pieces of a first component 10 composed of a plate-like resinous molded article 11, which are bridged by two pieces of a second component 20 composed of a resinous molded article 21. In the article of FIG. 7, the two pieces of the resinous molded article 11 are provided with plating 13 on the outer surface thereof. The resinous molded articles 21 are provided with plating 23 on the outer side surface thereof, and then are fitted in complementary contact portions (recesses) 15 formed on the inner surfaces of the resinous molded articles 11. Thus, the plating 23 of the resinous molded articles 21 contacts with the contact portions (recesses) 15 of the resinous molded articles 11. When the resinous molded articles 11 are formed of the thermoplastic resin composition (X) according to the present invention, occurrence of unpleasant sounds such as squeaking noise is suppressed even if the two molded articles dynamically contact with each other. Meanwhile, the resinous molded articles 21 of the second component 20 may also be formed of the thermoplastic resin composition (X).

Figure 8:
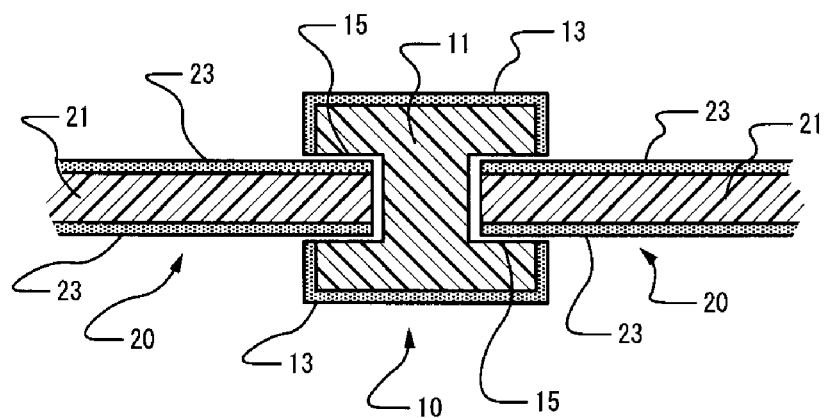
FIG. 8 is a cross-sectional view illustrating another mode of an article according to the present invention.

As another example of the present article, mention may be made of an article which, as shown in FIG. 8, is constituted by a first component 10 composed of a resinous molded article 11 having contact portions (recesses) 15 and second components 20 composed of resinous molded articles 21 inserted into the contact portions (recesses) 15. In the article of FIG. 8, the resinous molded article 11 is provided with plating 13 thereon except the contact portions (recesses) 15, and the resinous molded articles 21 are provided with plating 23 on both upper and lower surfaces thereof entirely. Thus, even if the plating 23 of the resinous molded article 21 contacts with the contact portion (recess) 15 of the resinous molded article 11, occurrence of unpleasant sounds such as squeaking noise is suppressed when the resinous molded article 11 is formed of the thermoplastic resin composition (X) according to the present invention even if the two molded articles dynamically contact with each other. In FIG. 8, the inner size of the contact portion (recess) 15 is made slightly larger than the end portion of the resinous molded article 12 that is inserted therein. The present invention can suppress the occurrence of the unpleasant sounds such as squeaking noise even if such play exists in the engaging portion. Meanwhile, the resinous molded article 21 of the second component 20 may also be formed of the thermoplastic resin composition (X).

Figure 9:
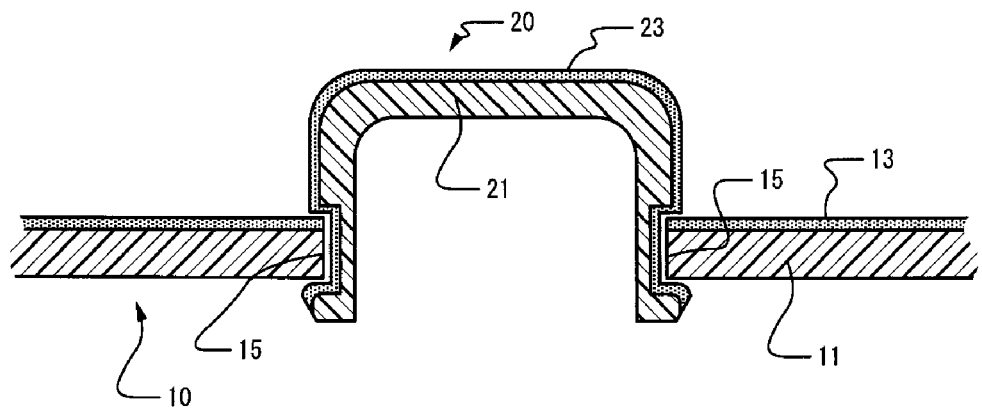
FIG. 9 is a cross-sectional view illustrating another mode of an article according to the present invention.

As another example of the present article, mention may be made of an article which, as shown in FIG. 9, is constituted by a first component 10 composed of a resinous molded article 11 having a hole and a second component 20 composed of a resinous molded article 21 which is engaged in the hole in snap-fit manner. In the article of FIG. 9, the resinous molded article 11 is provided with plating 13 on its upper surface only, and the resinous molded article 21 is provided with plating 23 on the entire outer surface thereof. Thus, when the second component 20 is engaged in the hole of the first component 10 as shown in FIG. 9, the contact portion (inner surface) 15 of the hole contacts with the plating 23 of the second component 20. However, when the resinous molded article 11 is formed of the thermoplastic resin composition (X) according to the present invention, occurrence of unpleasant sounds such as squeaking noise is suppressed even if the two molded articles dynamically contact with each other. Meanwhile, the resinous molded articles 21 of the second component 20 may also be formed of the thermoplastic resin composition (X).

Figure 10A:
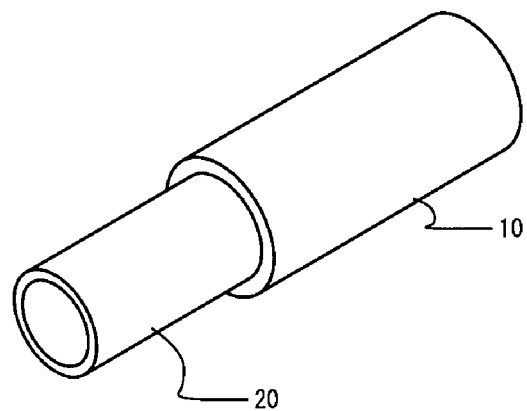
FIG. 10a is a perspective view illustrating another mode of an article according to the present invention.
Figure 10B:
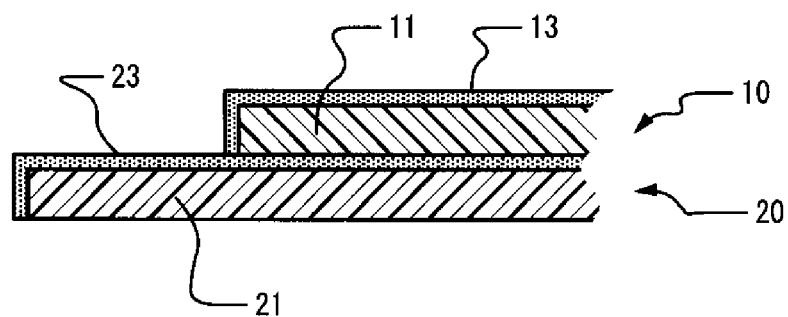
FIG. 10b is an axial cross-sectional view of the article of FIG. 10.
Figure 11:
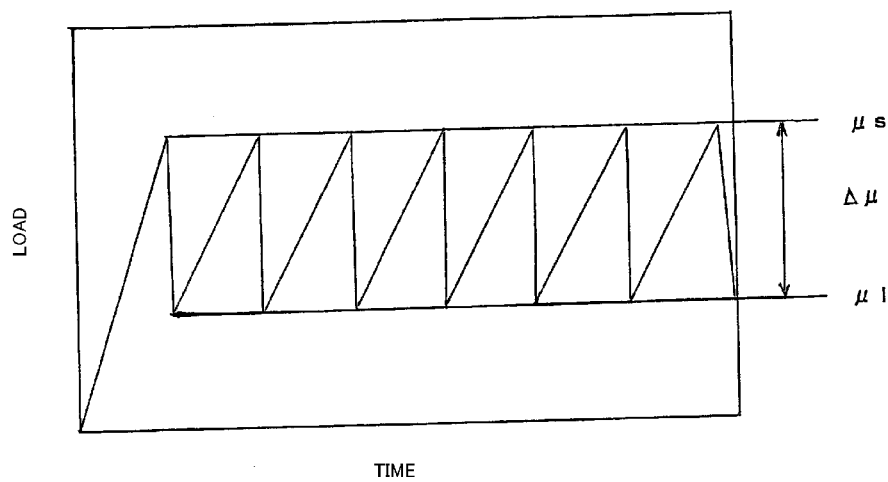
FIG. 11 is an explanatory diagram of the stick-slip phenomenon.
Figure 12:
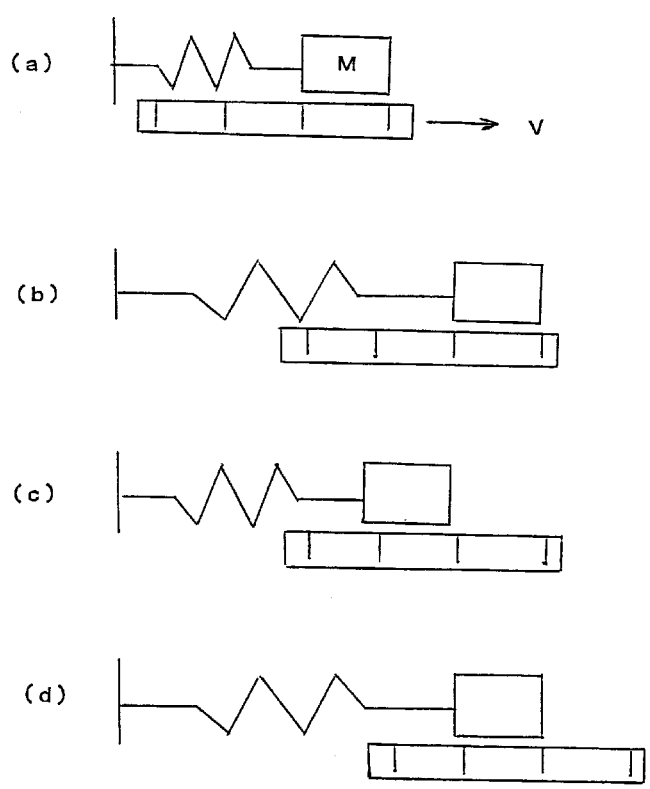
FIGS. 12(a), (b), (c) and (d) are model diagrams of the stick-slip phenomenon.

As another example of the present article, mention may be made of an article which, as shown in FIG. 10(a), is constituted by a first component 10 composed of a cylindrical resinous molded article 11 having plating 13 on the outer surface thereof and a second component 20 composed of a similar resinous molded article 21 which is telescopically engaged in the inside of the first component. This article is provided with plating 23 on the outer surface of the resinous molded article 21. Thus, when the two components are engaged with each other as shown in FIG. 10(b), the plating 23 of the second component 20 is brought into contact with the inner surface of the first component 10. In this case, when the resinous molded article 11 is formed of the thermoplastic resin composition (X) according to the present invention, occurrence of unpleasant sounds such as squeaking noise is suppressed even if the two components dynamically contact with each other. Meanwhile, the resinous molded article 21 of the second component 20 may also be formed of the thermoplastic resin composition (X).

Figure 14:
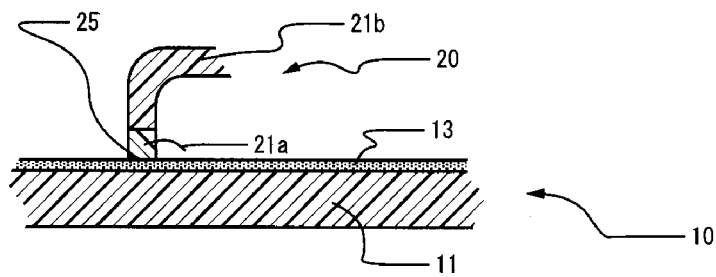
FIG. 14 is a cross-sectional view illustrating another mode of an article according to the present invention.

As another example of the present article, mention may be made of an article which, as shown in FIG. 14, is constituted by a first component 10 composed of a resinous molded article 11 which is provided with plating 13 on one surface thereof entirely and a second component 20 which is a non-plated product. The second component 20 has a contact portion (end surface) 25 composed of a molded portion 21a formed of the thermoplastic resin composition (X), and the other portion 21b than the contact portion 21a of the second component 20 may be formed of another material than the thermoplastic resin composition (X) or may be formed of the thermoplastic resin composition (X). In other words, the resinous molded articles 21a, 21b of the second component 20 may be entirely formed of the thermoplastic resin composition (X). In the article of FIG. 14, the contact portion (end surface) 25 of the second component 20 is brought into contact with the plated surface of the first component 10. Since the molded portion 21a constituting the contact portion (end portion) 25 is formed of the thermoplastic resin composition (X) according to the present invention, occurrence of unpleasant sounds such as squeaking noise is suppressed even if the two molded articles dynamically contact with each other. In particular, since the thermoplastic resin composition (X) is excellent in plating adhesion as well, the first component 10 may also be formed of the thermoplastic resin composition (X) that is the same as the portion 21a of the second component 20.

Figure 15:
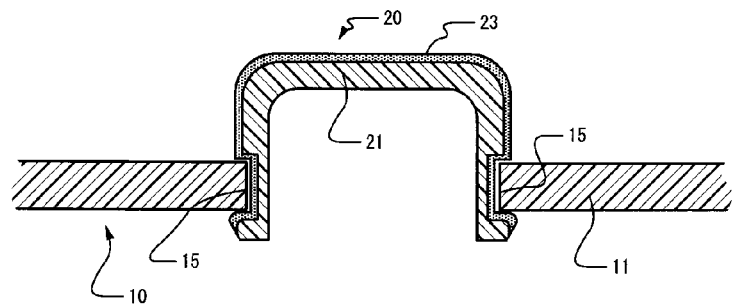
FIG. 15 is a cross-sectional view illustrating another mode of an article according to the present invention.

As another example of the present article, mention may be made of an article shown in FIG. 15. The article of FIG. 15 is the same as the embodiment shown in FIG. 9 except that the first component 10 is a non-plated product composed of the resinous molded article 11 without the plating 13. When the second component 20 is engaged in the hole of the first component 10 as shown in FIG. 15, the contact portion (inner surface) 15 of the hole contacts with the plating 23 of the second component 20. However, when the resinous molded article 11 is formed of the thermoplastic resin composition (X) according to the present invention, occurrence of unpleasant sounds such as squeaking noise is suppressed even if the two molded articles dynamically contact with each other. In particular, since the thermoplastic resin composition (X) is excellent in plating adhesion as well, the second component 20 may also be formed of the thermoplastic resin composition (X) that is the same as the first component 10. Furthermore, when the rubber part of the thermoplastic resin composition (X) comprises an ethylene/alpha-olefin rubber in a predetermined proportion and optionally an acrylic rubber in a predetermined proportion, the present article is made excellent in weatherability and gloss, thereby providing articles suitable for exterior parts. Such exterior parts include, for example, front grilles for automobiles, and thus squeaking noise generated from the front grill during car washing can be prevented according to the present invention.

2. Thermoplastic Resin Composition (X)

The thermoplastic resin composition(X) (in this description also referred as "component (X)") used in the present article comprises, as a resin component, a rubber-reinforced aromatic vinyl resin (in this description also referred as "component (A)"), and may contain another resin component, as necessary. Examples of such another resin include polyethylene resins, polypropylene resins, polybutylene terephthalate resins, polyethylene terephthalate resins, polycarbonate resins and polyamide resins, and polypropylene resins are preferable from the viewpoint of plating adhesion.

From the viewpoint of impact resistance, the thermoplastic resin composition (X) used in the present article has a rubber content of preferably 3 to 60% by mass, more preferably 5 to 60% by mass, further more preferably 8 to 40% by mass, especially preferably 10 to 30% by mass, provided that the whole thermoplastic resin composition (X) is 100% by mass. Also, it is preferred that the thermoplastic resin composition (X) has crystallinity since the effect of suppressing the occurrence of unpleasant sounds such as squeaking noise resulting from the dynamic contact of components becomes more excellent. Concretely, the melting point measured in accordance with JIS K 7121-1987 is preferably in the range of 0 to 130° C., more preferably in the range of 0 to 120° C., further more preferably in the range of 10 to 90° C., especially preferably in the range of 20 to 80° C. Meanwhile, as described above, the melting point (Tm) can be obtained by reading a peak temperature of an endothermic pattern in accordance with JIS K 7121-1987. The number of peaks of the endothermic pattern in the range of 0 to 130° C. is not limited to one, but may be two or more. Further, the thermoplastic resin composition (X), as in the later-described case of comprising a polypropylene-based resin, may have a melting point at a temperature exceeding 130° C. in addition to the melting point in the range of 0 to 130° C. Further, the Tm (melting point) in the range of 0 to 130° C. may be derived from the below-mentioned rubber-reinforced aromatic vinyl resin(A), especially a rubber part (a1), or the below-mentioned additives, for example, a slidability imparting agent such as a polyolefin wax with a low molecular weight, e.g., a number average molecular weight of 10,000 or less. Meanwhile, the slidability imparting agent may be added to the rubber-reinforced aromatic vinyl resin (A), or may be added to the thermoplastic resin composition (X) directly.

Hereinafter, the thermoplastic resin composition (X) used in the present article will be described in detail.

2-1. Rubber-Reinforced Aromatic Vinyl Resin (A)

The rubber-reinforced aromatic vinyl resin (A) is suitably used for imparting plating adhesion and impact resistance to the thermoplastic resin composition (X), and has a rubber content of preferably 5 to 60% by mass, more preferably 5 to 40% by mass, further more preferably 5 to 30% by mass, provided that the whole thermoplastic resin composition (X) is 100% by mass. Further, the rubber-reinforced aromatic vinyl resin (A) preferably has crystallinity in order to further improve the thermoplastic resin composition (X) in the function of suppressing the occurrence of unpleasant sounds such as squeaking noise. Concretely, the melting point of the thermoplastic resin composition (X) measured in accordance with JIS K 7121-1987 is preferably in the range of 0 to 130° C., more preferably in the range of 0 to 120° C., further more preferably in the range of 10 to 90° C., especially preferably in the range of 20 to 80° C.

The rubber-reinforced aromatic vinyl resin (A) is constituted by a rubber part (a1) originated from a rubbery polymer and a resin part (a2) having a structural unit originated from a vinyl monomer, and it is preferable that the resin part (a2) is grafted onto the rubber part (a1) to form a graft copolymer. Thus, the rubber-reinforced aromatic vinyl resin (A) is preferably constituted by at least the above graft copolymer and a resin part (a2) which is not grafted onto the rubber part (a1), and may further contain a rubber part (a1) onto which no resin part (a2) is grafted, or another component such as an additive.

Meanwhile, the rubber part (a1) only has to be rubbery, namely, have rubber elasticity at 25° C., and is differentiated from the resin part (a2) which does not have such a property at the same temperature.

The rubber part (a1) may be a homopolymer or a copolymer as long as it is rubbery (or has rubber elasticity) at 25° C. Further, the rubber part (a1) may be constituted by any of a diene polymer (hereinafter, referred as "diene rubber") and a non-diene polymer (hereinafter, referred as "non-diene rubber"). Further, these polymers may be crosslinked polymers or uncrosslinked polymers. Among them, it is preferable that the rubber part (a1) is at least partly constituted by a diene rubber from the viewpoint of improving impact resistance in the present invention. Further, from the viewpoint of the effect of suppressing the unpleasant sounds such as squeaking noise, it is preferable that the rubber part (a1) is at least partly constituted by a non-diene rubber, and it is particularly preferable that the rubber part (a1) is entirely constituted by a non-diene rubber.

The non-diene rubber includes, for example, ethylene/alpha-olefin rubbers; urethane rubbers; acrylic rubbers; silicone rubbers; silicone/acrylic IPN rubbers; and hydrogenated polymers (which have a hydrogenation ratio of not less than 50%) resulting from hydrogenation of (co)polymers containing a structural unit originated from a conjugated diene compound. The hydrogenated polymers may be block copolymers or may be random copolymers.

In the present invention, an ethylene/alpha-olefin rubber is used as the non-diene rubber from the viewpoint of the effect of suppressing the unpleasant sounds such as squeaking noise. The ethylene/alpha-olefin rubber is a copolymer rubber comprising a structural unit originated from ethylene and a structural unit originated from an alpha-olefin. Examples of the alpha-olefin include propylene, 1-butene, 1-pentene, 1-hexene, 4-methyl-1-pentene, 1-heptene, 1-octene, 1-decene, 1-dodecene, 1-hexadecene and 1-eicosene. These alpha-olefins can be used singly or as a mixture of two or more. The number of carbon atoms of the alpha-olefin is, from the viewpoint of impact resistance, preferably 3 to 20, more preferably 3 to 12, and still more preferably 3 to 8. The mass ratio of ethylene:alpha-olefin in an ethylene/alpha-olefin rubber is usually 5 to 95:95 to 5, preferably 50 to 95:50 to 5, and more preferably 60 to 95:40 to 5. When the mass ratio of ethylene:alpha-olefin is in the above range, impact resistance of the obtained molded articles becomes better and thus preferable. The ethylene/alpha-olefin rubber may comprise a structural unit originated from a nonconjugated diene, as necessary. The nonconjugated diene includes alkenylnorbornenes, cyclic dienes and aliphatic dienes, and is preferably 5-ethylidene-2-norbornene and dicyclopentadiene. These nonconjugated dienes can be used singly or as a mixture of two or more. Proportion of the nonconjugated diene to the total amount of the rubbery polymer is usually 0 to 10% by mass, preferably 0 to 5% by mass, and more preferably 0 to 3% by mass.

In the present invention, an ethylene/alpha-olefin rubber that is preferably used is one having a melting point (Tm) of 0 to 130° C. The Tm (melting point) of the ethylene/alpha-olefin rubber is more preferably 0 to 120° C., furthermore preferably 10 to 90° C., especially preferably 20 to 80° C. The fact that the ethylene/alpha-olefin rubber has a melting point (Tm) means that the rubber has crystallinity. Therefore, the use of the ethylene/alpha-olefin rubber having a melting point (Tm) allows the thermoplastic resin composition (X) to exhibit a melting point in the range of 0 to 120° C., and further improve not only impact resistance but also the effect of suppressing unpleasant sounds such as squeaking noise at contact portions of resinous parts against plating. It is considered that the rubber-reinforced aromatic vinyl resin (A) having crystallinity prevents the occurrence of stick-slip phenomenon, and thus prevents the occurrence of unpleasant sounds such as squeaking noise even if contact portions of resinous parts dynamically contact with plating. Meanwhile, the relationship between the stick-slip phenomenon and the squeaking noise is disclosed in Japanese Patent Laid-Open (Kokai) No. 2011-174029 and the like.

Mooney viscosity (ML1+4, 100° C.; according to JIS K6300) of the ethylene/alpha-olefin rubber is usually 5 to 80, preferably 10 to 65, and more preferably 10 to 45. When the Mooney viscosity is within the above range, moldability is excellent, and besides impact strength and appearance of the molded articles are better, and thus the range is preferable.

From the viewpoint of reducing occurrence of unpleasant sounds such as squeaking noise, the ethylene/alpha-olefin rubber is preferably ethylene/alpha-olefin copolymers comprising no nonconjugated diene component; among these, more preferable are an ethylene/propylene copolymer, an ethylene/1-butene copolymer and an ethylene/1-octene copolymer; and especially preferable is an ethylene/propylene copolymer.

The acrylic rubber includes, for example, rubbers which are obtained by (co)polymerizing an monomer comprising an alkyl(meth)acrylate compound such as methyl acrylate, ethyl acrylate, n-propyl acrylate, n-butyl acrylate, 2-ethylhexyl acrylate, ethoxyethoxyethyl acrylate, methoxytripropylene glycol acrylate, 4-hydroxybutyl acrylate, lauryl methacrylate, and stearyl methacrylate. These alkyl(meth)acrylate compounds can be used singly or in a combination of two or more. Besides the above alkyl(meth)acrylate compounds, the above monomer may further comprise various vinyl monomers, for example, an aromatic vinyl compound such as styrene, alpha-methylstyrene and vinyl toluene, a vinyl cyanide compound such as acrylonitrile and methacrylonitrile, methacrylic acid-modified silicone, and fluorine-containing vinyl compounds in a range of 30% by mass or less relative to the total of the monomers. When the rubber part of the above component (A) contains the above-mentioned acrylic rubber as a non-diene rubber, appearance such as gloss of the resultant molded article becomes more satisfactory.

From the viewpoint of the effect of reducing squeaking noise, the rubber part of the component (A) is preferably constituted wholly by the non-diene rubber, especially ethylene/alpha-olefin rubber, but may comprise, in addition to the non-diene rubber, the diene rubber. When the rubber part of the component (A) is constituted by the diene rubber in addition to the non-diene rubber, moldability and impact resistance of the thermoplastic resin composition (X), and appearance of the resultant molded article become more satisfactory.

The diene rubber includes homopolymers such as polybutadiene and polyisoprene; butadiene-based copolymers such as styrene/butadiene copolymers, styrene/butadiene/styrene copolymers, acrylonitrile/styrene/butadiene copolymers and acrylonitrile/butadiene copolymers; and isoprene-based copolymers such as styrene/isoprene copolymers, styrene/isoprene/styrene copolymers and acrylonitrile/styrene/isoprene copolymers. These may be random copolymers or may be block copolymers. These can be used singly or in a combination of two or more. The dienic rubbery polymer may be a crosslinked polymer or an uncrosslinked polymer.

In the present invention, the content of the rubber part (a1) in the rubber-reinforced aromatic vinyl resin (A) is preferably 3 to 80% by mass, more preferably 5 to 70% by mass, and further more preferably 10 to 65% by mass, with respect to 100% by mass of the entire rubber-reinforced aromatic vinyl resin (A). When the content of the rubber part (a1) is within the above range, the thermoplastic resin composition (X) according to the present invention becomes further superior in impact resistance, unpleasant sounds reducing effect, dimensional stability, plating adhesion, moldability and so on, and thus is preferable.

The resin part (a2) of the rubber-reinforced aromatic vinyl resin (A) is constituted by a structural unit originated from a vinyl monomer which comprises an aromatic vinyl compound as an essential component and may optionally comprise a compound copolymerizable with the aromatic vinyl compound. Specific examples of the aromatic vinyl compound include styrene, alpha-methylstyrene, o-methylstyrene, p-methylstyrene, beta-methylstyrene, ethylstyrene, p-tert-butylstyrene, vinyltoluene, vinylxylene and vinylnaphthalene. These compounds can be used singly or in a combination of two or more. Among these, styrene and alpha-methylstyrene are preferable, and styrene is especially preferable.

As such a compound copolymerizable with an aromatic vinyl compound, at least one selected from vinyl cyanide compounds and (meth)acrylic acid ester compounds can be preferably used; and as required, another vinyl monomer copolymerizable with these compounds can also be used. Such another vinyl monomer includes maleimide compounds, unsaturated acid anhydrides, carboxyl group-containing unsaturated compounds, hydroxyl group-containing unsaturated compounds, oxazoline group-containing unsaturated compounds and epoxy group-containing unsaturated compounds; and these can be used singly or in a combination of two or more.

Specific examples of the vinyl cyanide compounds include acrylonitrile, methacrylonitrile, ethacrylonitrile, alpha-ethylacrylonitrile and alpha-isopropylacrylonitrile. These compounds can be used singly or in a combination of two or more. Among these, acrylonitrile is preferable.

Specific examples of the (meth)acrylic acid ester compounds include methyl(meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, tert-butyl (meth)acrylate, hexyl (meth)acrylate, n-octyl (meth)acrylate, 2-ethylhexyl (meth)acrylate, cyclohexyl (meth)acrylate, phenyl (meth)acrylate and benzyl (meth)acrylate. These compounds can be used singly or in a combination of two or more. Among these, methyl methacrylate is preferable.

Specific examples of the maleimide compounds include N-phenylmaleimide and N-cyclohexylmaleimide. These compounds can be used singly or in a combination of two or more.

Specific examples of the unsaturated acid anhydrides include maleic anhydride, itaconic anhydride and citraconic anhydride. These compounds can be used singly or in a combination of two or more.

Specific examples of the carboxyl group-containing unsaturated compounds include (meth)acrylic acid, ethacrylic acid, maleic acid, fumaric acid, itaconic acid, crotonic acid and cinnamic acid. These compounds can be used singly or in a combination of two or more.

Specific examples of the hydroxyl group-containing unsaturated compounds include 3-hydroxy-1-propene, 4-hydroxy-1-butene, cis-4-hydroxy-2-butene, trans-4-hydroxy-2-butene, 3-hydroxy-2-methyl-1-propene, 2-hydroxyethyl (meth)acrylate, 2-hydroxypropyl (meth)acrylate and 3-hydroxypropyl (meth)acrylate. These compounds can be used singly or in a combination of two or more.

In the case where the total amount of the structural units originated from the aromatic vinyl compound and the structural units originated from the compound copolymerizable with the aromatic vinyl compound is taken to be 100% by mass, the lower limit value of the content of the structural units originated from the aromatic vinyl compound in the rubber-reinforced aromatic vinyl resin (A) is preferably 40% by mass, more preferably 50% by mass, and still more preferably 60% by mass. Here, the upper limit value is usually 100% by mass.

In the case where the resin part (a2) of the rubber-reinforced aromatic vinyl resin (A) comprises structural units originated from the aromatic vinyl compound and the vinyl cyanide compound, the content of the structural units originated from the aromatic vinyl compound is usually 40 to 90% by mass, and preferably 55 to 85% by mass, provided that the total amount of both structural units is taken to be 100% by mass; and the content of the structural units originated from the vinyl cyanide compound is 10 to 60% by mass, and preferably 15 to 45% by mass, provided that the total amount of both structural units is taken to be 100% by mass.

The rubber-reinforced aromatic vinyl resin (A) can be produced, for example, by graft-polymerizing a vinyl monomer (b) composed of an aromatic vinyl compound and optionally another vinyl compound copolymerizable with the aromatic vinyl compound in the presence of a rubbery polymer (a) comprising a crystalline rubber component having a melting point (Tm) of 0 to 130° C. Polymerization method in this production method is not especially limited as long as being capable of providing the above graft copolymer, and a known method can be adopted. The polymerization method can be one using emulsion polymerization, suspension polymerization, solution polymerization, bulk polymerization or a combination thereof. In these polymerization methods, a known polymerization initiator, chain transfer agent (molecular weight regulator), emulsifier and the like can suitably be used.

In the above production method, there can usually be provided a mixed product of the graft copolymer formed by graft-polymerizing a (co)polymer of the vinyl monomer to the rubbery polymer and the (co)polymer of the vinyl monomer which are not graft-polymerized to the rubbery polymer. As the case may be, the mixed product may comprise the rubbery polymer having no (co)polymer graft-polymerized thereto. The present rubber-reinforced aromatic vinyl resin (A) comprises a rubber part (a1) originated from a rubbery polymer and a resin part (a2) originated from an aromatic vinyl monomer, and the rubber part (a1) is preferably graft-polymerized with the resin part (a2) to form a graft copolymer. Thus, the mixed product of the graft copolymer and the (co)polymer as produced in the above mentioned manner can be used as the rubber-reinforced aromatic vinyl resin (A), as it is.

The rubber-reinforced aromatic vinyl resin (A) may be supplemented with a (co)polymer (A') produced by polymerizing a vinyl monomer comprising an aromatic vinyl compound and optionally another vinyl compound copolymerizable with the aromatic vinyl compound in the absence of the rubbery polymer (a). This (co)polymer (A') constitutes the resin part (a2) which is not graft-polymerized onto the rubber part (a1) when it is added to the rubber-reinforced aromatic vinyl resin (A).

As mentioned above, the rubber part of the present rubber-reinforced aromatic vinyl resin (A) may be a mixture of a non-diene rubber and a diene rubber. Production method of the rubber-reinforced aromatic vinyl resin (A) containing these different rubbers includes, for example, a method in which a vinyl monomer (b) is graft-polymerized in a presence of a rubbery polymer (a) comprising a dienic rubbery polymer and a non-dienic rubbery polymer, and a method in which a rubber-reinforced aromatic vinyl resin produced by graft-polymerizing a vinyl monomer (b) in a presence of a non-dienic rubbery polymer is mixed with a rubber-reinforced aromatic vinyl resin produced by graft-polymerizing a vinyl monomer (b) in a presence of a dienic rubbery polymer.

Graft ratio of the rubber-reinforced aromatic vinyl resin (A) is usually 10 to 150%, preferably 15 to 120%, more preferably 20 to 100%, and especially preferably 20 to 80%. When the graft ratio of the rubber-reinforced aromatic vinyl resin (A) is within the above range, impact resistance and plating adhesion of the resin composition become better.

The graft ratio can be determined by the following equation (1).

$$\text{Graft ratio(\% by mass)} = ((S-T)/T) \times 100 \quad (1)$$

In the above equation, S is a mass (g) of an insoluble matter obtained by adding 1 g of the rubber-reinforced aromatic vinyl resin (A) to 20 ml of acetone, shaking the resultant for 2 hours by a shaker under the temperature condition of 25° C., and thereafter centrifugally separating the resultant for 60 min under the temperature condition of 5° C. into the insoluble matter and a soluble matter by a centrifugal separator (rotation speed: 23,000 rpm); and T is a mass (g) of the rubber part (a1) contained in 1 g of the rubber-reinforced aromatic vinyl resin (A). The mass of the rubber part (a1) can be acquired by a method of a calculation from a polymerization prescription and a polymerization conversion.

The graft ratio can be regulated, for example, by suitably selecting kind and amount of a chain transfer agent, kind and amount of a polymerization initiator, addition method and addition time of monomers during polymerization, polymerization temperature and others employed in graft polymerization for producing the rubber-reinforced aromatic vinyl resin (A).

Limiting viscosity (in methyl ethyl ketone, 30° C.) of the component soluble in acetone (hereinafter, referred as "acetone-soluble matter") of the rubber-reinforced aromatic vinyl resin (A) of the thermoplastic resin composition according to the present invention is usually 0.05 to 0.9 dl/g, preferably 0.07 to 0.8 dl/g, and more preferably 0.1 to 0.7 dl/g. When the limiting viscosity is within the above range, impact resistance and moldability of the resin composition become better.

Measurement of the limiting viscosity [η] can be carried out by the following method. First, the acetone-soluble matter of the rubber-reinforced aromatic vinyl resin (A) is dissolved in methyl ethyl ketone to make five solutions having different concentrations. From the results of reduced viscosities at 30° C. of the solutions of the respective concentrations using an Ubbelohde viscometer, a limiting viscosity [η] is determined. The unit is dl/g.

The limiting viscosity [η] can be regulated, for example, by suitably selecting kind and amount of a chain transfer agent, kind and amount of a polymerization initiator, addition method and addition time of monomers during polymerization, polymerization temperature, polymerization time and others employed in graft polymerization of the rubber-reinforced aromatic vinyl resin (A). Alternatively, this regulation may be performed by blending a rubber-reinforced aromatic vinyl resin (A) with a (co)polymer (A') having a limiting viscosity [η] that is different from the limiting viscosity [η] of the above acetone-soluble matter.

2-2. Polypropylene Resin

The polypropylene resin, which is a resinous component that may be contained in the present thermoplastic resin composition (X), includes, for example, homopolymers of propylene, random or block copolymers which are composed mainly of propylene and further contain ethylene or an alpha-olefin with not less than 4 carbon atoms as a comonomer, and a mixture of these.

The polypropylene resin has a melt flow rate (MFR) measured at a temperature of 230° C. with a load of 2.16 kg of usually 0.1 to 200 g/10 min, preferably 1 to 150 g/10 min and more preferably 2 to 100 g/10 min, a molecular weight distribution (Mw/Mn) measured by GPC of usually 1.2 to 10, preferably 1.5 to 8 and more preferably 2 to 6, and a melting point (Tm) of usually 150 to 180° C. and preferably 160 to 170° C.

Production methods for the polypropylene resin are not particularly limited as long as the above MFR, molecular weight distribution and melting point are satisfied, but it is usually produced using a Zieglar-Natta (ZN) catalyst or metallocene catalyst.

As a Zieglar-Natta (ZN) catalyst, a highly active catalyst is preferable, and a highly active catalyst composed of a solid catalyst component containing magnesium, titanium, halogen and an electron donor as essential components in combination with an organic aluminum compound is especially preferable.

As a metallocene catalyst, effective is a catalyst which is composed of a metallocene complex in which an organic compound having a cyclopentadienyl skeleton and a halogen atom are coordinated to a transition metal such as zirconium, hafnium and titanium and is further combined with an alumoxane compound, ion exchange silicate, organic aluminum compound or the like.

A comonomer to be copolymerized with propylene includes, for example, ethylene, butene-1, pentene-1, hexene-1 and 4-methyl-pentene-1. The content of these comonomer components is usually 0 to 15% by mass and preferably 0 to 10% by mass relative to 100% by mass of the total amount of the copolymer. Of these, particularly preferable is a block copolymer of propylene and ethylene and/or butane-1.

The ratio of the amount of each monomer in the reaction solution does not have to be always constant. Each monomer may be supplied in a constant mixing ratio, or may be supplied in a mixing ratio which is changed with lapse of time. Also, considering copolymer reaction ratio, either of the monomers can be dividedly added.

Any method of polymerization in a manner that allows the catalyst component to efficiently contact each monomer can be employed. Specific examples that can be adopted include a slurry method using an inactive solvent, a bulk method using substantially no inactive solvent but propylene as a solvent, a solution method, and a vapor deposition method using substantially no liquid solvent but keeping each monomer in substantially gaseous form.

In addition, any one of continuous polymerization and batch polymerization may be used. In case of slurry polymerization, as a polymerization solvent, a saturated aliphatic or aromatic hydrocarbon such as hexane, heptane, pentane, cyclohexane, benzene and toluene can be used alone or in combination.

As to polymerization conditions, polymerization temperature is usually −78 to 160° C. and preferably 0 to 150° C., and in this instance, hydrogen can be auxiliary used as a molecular weight regulator. In addition, polymerization pressure is usually 0 to 90 kg/cm$^2$·G, preferably 0 to 60 kg/cm$^2$·G and particularly preferably 1 to 50 kg/cm$^2$·G.

The amount to be used of the polypropylene resin constituting the present composition is preferably 5 to 45% by mass, more preferably 10 to 30% by mass, provided that the whole of the thermoplastic resin composition (X) is 100% by mass. When the amount to be used of the polypropylene resin is in the above range, plating adhesion becomes better and thus preferable.

2-3. Preferable Embodiment of the Thermoplastic Resin Composition (X)

In the article of the present invention, in the case where all the two components that contact each other are plated products or where only one of the two components that contact with each other is a plated product, the thermoplastic resin composition (x) is preferably one having a noise risk of 3 or less from the viewpoint of the excellence in impact resistance and appearance and the prevention of occurrence of unpleasant sounds such as squeaking noise at a contact portion against a plated portion. In particular, it is preferred that the rubber part of the rubber-reinforced aromatic vinyl resin (A) constituting the thermoplastic resin composition (X) comprises an ethylene/alpha-olefin rubber as an essential component, and optionally comprises at least one of a diene rubber or an acrylic rubber. In particular, the rubber part preferably comprises 13 to 100% by mass of an ethylene/alpha-olefin rubber, 0 to 75% by mass of a diene rubber, and 0 to 78% by mass of an acrylic rubber. When the rubber part is constituted by two components, namely, an ethylene/alpha-olefin and a diene rubber, excellent impact resistance and prevention of occurrence of unpleasant sounds can be attained with plating adhesion being maintained, and in this case, the rubber part preferably comprises 10 to 95% by mass of an ethylene/alpha-olefin rubber and 5 to 90% by mass of a diene rubber, more preferably 40 to 90% by mass of an ethylene/alpha-olefin rubber and 10 to 60% by mass of a diene rubber, furthermore preferably 50 to 80% by mass of an ethylene/alpha-olefin rubber and 20 to 50% by mass of a diene rubber, and particularly preferably 60 to 70% by mass of an ethylene/alpha-olefin rubber and 30 to 40% by mass of a diene rubber (provided that the total of the two kinds of rubbers is 100% by mass). When the rubber part is constituted by three components, namely, an ethylene/alpha-olefin, a diene rubber and an acrylic rubber, not only plating adhesion, impact resistance and prevention of occurrence of unpleasant sounds can be attained but also weatherability and appearance such as gloss can be improved, and in this case, the rubber part preferably comprises 20 to 90% by mass of an ethylene/alpha-olefin rubber, 1 to 56% by mass of a diene rubber and 5 to 68% by mass of an acrylic rubber, and more preferably 30 to 80% by mass of an ethylene/alpha-olefin rubber, 3 to 35% by mass of a diene rubber and 13 to 56% by mass of an acrylic rubber (provided that the total of the three kinds of rubbers is 100% by mass).

The thermoplastic resin composition (X) satisfying the above-mentioned proportion of the rubber part can be produced by, for example, by mixing a rubber-reinforced aromatic vinyl resin (A1) having a rubber part constituted by an ethylene/alpha-olefin rubber with a rubber-reinforced aromatic vinyl resin (A2) having a rubber part constituted by a diene rubber and/or a rubber-reinforced aromatic vinyl resin (A3) having a rubber part constituted by an acrylic rubber, and preferably by mixing 10 to 100% by mass of the above resin (A1) with 0 to 40% by mass of the above resin (A2) and/or 0 to 50% by mass of the above resin (A3) (provided that the total of A1, A2 and A3 is 100% by mass). When the rubber part is constituted by two components, namely, an ethylene/alpha-olefin rubber and a diene rubber, preferably 50 to 95% by mass of the above resin (A1) is mixed with 5 to 50% by mass of the above resin (A2), more preferably 60 to 90% by mass of the above resin (A1) is mixed with 10 to 40% by mass of the above resin (A2), and particularly preferably 70 to 80% by mass of the above resin (A1) is mixed with 20 to 30% by mass of the above resin (A2) (provided that the total of A1 and A2 is 100% by mass). When the rubber part is constituted by three components, namely, an ethylene/alpha-olefin rubber, a diene rubber and an acrylic rubber, preferably 15 to 80% by mass of the above resin (A1) is mixed with 2 to 38% by mass of the above resin (A2) and 5 to 47% by mass of the above resin (A3), and more preferably 20 to 70% by mass of the above resin (A1) is mixed with 3 to 35% by mass of the above resin (A2) and 8 to 45% by mass of the above resin (A3) (provided that the total of A1, A2 and A3 is 100% by mass). Methods for mixing these resins include melt-kneading and the like.

3. Other Additives

Further, in addition to the above components (A) and other resins, the thermoplastic resin composition (X) according to the present invention may optionally contain various additives such as slidability imparting agent, antioxidants, processing stabilizers, ultraviolet absorbents, light stabilizers, antistatic agents, crystal nucleating additives, slipping agents, plasticizers, metal inactivating agents, coloring pigments, various inorganic fillers, glass fibers, reinforcing agents, flame retardants, mold release agents and foaming agents to the extent that does not impair the object of the present invention.

The above slidability imparting agent can impart slidability to the thermoplastic resin composition (X) so as to make it easier to assemble the present article, and besides can impart the effect of suppressing occurrence of unpleasant sounds such as squeaking noise from the present article in use. Typical examples of the slidability imparting agent include low molecular weight oxidized polyethylene, ultra-high molecular weight polyethylene and polytetrafluoroethylene as described in Japanese Patent Laid-Open (Kokai) No. 2011-137066, and besides low molecular weight (for example, number average molecular weight of 10,000 or less) polyolefin wax and silicone oil.

The above polyolefin wax is preferably a polyethylene wax having a melting point of 0 to 130° C. When a polyolefin wax having such a melting point or another additive having a melting point of 0 to 130° C. is added to the thermoplastic resin composition (X), the effect of suppressing occurrence of unpleasant sounds such as squeaking noise can be obtained even if the rubber part of the rubber-reinforced aromatic vinyl resin (A) has no melting point (Tm). The slidability imparting agent can be used singly or as a mixture of two or more. The amount to be added of the slidability imparting agent is usually 0.1 to 10 parts by mass relative to 100 parts by mass of the thermoplastic resin composition (X). The slidability imparting agent may be added when the above component (A) is melt-kneaded with another component, or may be one that is previously added during the production of the component (A).

4. Production Method of Component (X)

The thermoplastic resin composition (X) according to the present invention can be produced by mixing the respective components in a predetermined blend ratio by a tumbler mixer, a Henschel mixer or the like, and thereafter melt-kneading the mixture using a kneading machine such as a single-screw extruder, a twin-screw extruder, a Banbury mixer, a kneader, a roll and a feeder ruder under proper conditions. A preferable kneading machine is a twin-screw extruder. Further, when the respective components are kneaded, they may be charged in whole so as to be kneaded, or may be charged stepwise or dividedly so as to be kneaded. Also, after kneading in a banbury mixer, a kneader or the like, pelletization may be performed in an extruder.
Fibrous inorganic fillers are preferably supplied through a side feeder to the mid-portion of the extruder in order to prevent cut during kneading. The melt-kneading temperature is usually 200 to 260° C. and preferably 220 to 240° C.

The present thermoplastic resin composition (X) thus-obtained by melt-kneading the components provides resinous molded articles on the surface of which a metal layer can be directly formed by a method such as plating utilizing part of the rubber phase of the component (A) as an anchor. The average particle diameter of the rubber phase is preferably 0.1 to 1.0 µm, further preferably 0.15 to 0.8 µm and particularly preferably 0.2 to 0.6 µm. This average particle diameter can be measured by a conventional method using an electronic microscope. Regulation of the average particle diameter of the rubber phase can be performed by using a rubbery polymer satisfying the above average particle diameter upon production of the component (A) and besides regulating a melt-kneading temperature, a shear rate or the like, and when a continuous kneading machine such as an extruder is used as a kneading machine, it can be regulated by the feed amount of the resin composition, the number of rotation or the like.

5. Production Method of the Article of the Present Invention

The thermoplastic resin composition (X) of the present invention can be made into a resinous molded article by conventional molding methods such as injection molding, press molding, sheet extrusion molding, vacuum molding, profile extrusion molding and foaming molding. A method of performing metal plating on the surface of the resinous molded article molded from the thermoplastic resin composition (X) includes wet plating methods such as electroless plating, direct plating and electro plating and dry plating methods such as vacuum evaporation method, spattering method and ion plating method. According to the electroless plating method, a reducing agent (sodium hypophosphate, sodium borohydrate and the like) is added to a solution containing metal ions such as nickel and copper, and the resinous molded article is immersed in the aqueous solution and heated to 90 to 100° C. to uniformly plate a metal on the surface of the resinous molded article. In this case, it is desired that the surface of the resinous molded article is previously chemically etched and sensitized with an etching solution such as sulfuric acid/chromic acid. According to the vacuum evaporation method, the metal can be plated onto the surface of the resinous molded article by heating and evaporating various metals in high vacuum of $10^{-4}$ to $10^{-5}$ mmHg. In the components constituting the present article, the contact portion (namely, a portion having a non-plated site) which contacts with the plated portion of the other component can be obtained by performing the plating of the above resinous molded article while a part thereof is masked by a tape or the like, and then removing the masking. Alternatively, the above contact portion (namely, a portion having a non-plated site) may be obtained by plating the resinous molded article as a whole, and then cutting the molded article or scraping a plated surface.

Since the thermoplastic resin composition (X) of the present invention has excellent properties as mentioned above, a laminate having a metal layer formed on the surface of a resinous molded article which may have a different shape obtained by the above molding methods can be used as metal-plated parts, for example, vehicle interior components such as meter visor, console box, glove box, and cup holders; exterior equipment for vehicles such as front grill, wheel cap, bumper, fender, spoiler, garnish, door mirrors, radiator grills, and knobs; lighting equipment such as straight tube LED lamp, light bulb type LED lamp, and light bulb type fluorescent lamp; household appliances such as mobile phone, tablet terminal, rice cooker, refrigerator, microwave, gas stove, vacuum cleaner, dishwasher, air cleaner, air conditioner, heater, television set, and recorders; office automation equipment such as printer, fax, copier, computer, and projector; acoustic equipment such as audio equipment, organ, and electronic piano; caps of containers for cosmetics; and battery cell casings. Meanwhile, the components of the article of the present invention may be provided on its surface having no metal layer with a layer of another resin.

EXAMPLES

Hereinafter, the present invention will be described more specifically by way of Examples, but the present invention is not limited to the following Examples. In Examples, parts and % are on mass basis unless otherwise specified.

1. Raw Material [P]

As rubber-reinforced aromatic vinyl resins, ethylene/alpha-olefin rubber-reinforced aromatic vinyl resins (raw material P1 and P2) obtained in the following Synthesis Examples 1 and 2, a diene rubber-reinforced aromatic vinyl resin (raw material P3) obtained in the following Synthesis Example 3, and an acrylic rubber-reinforced aromatic vinyl resin (raw material P4) obtained in the following Synthesis Example 4 were used.

1-1. Synthesis Example 1 (Synthesis of Raw Material P1 (AES Resin))

A stainless steel autoclave equipped with a ribbon stirrer blade, an auxiliary agent-continuous adding device, a thermometer and the like was charged with 25 parts of an ethylene/propylene copolymer rubber (ethylene/propylene=78/22(%), melting point (Tm)=40° C., glass transition temperature=−50° C., Moony viscosity (ML1+4, 100° C.)=20), 11 parts of styrene, 4 parts of acrylonitrile, 0.5 part of tert-dodecylmercaptane and 110 parts of toluene, and the internal temperature was raised. At the time when the internal temperature reached 75° C., the content in the autoclave was stirred for 1 hour to obtain a homogeneous solution. Thereafter, 0.09 part of tert-butylperoxyisopropyl monocarbonate was added, and the temperature was further raised. While the internal temperature was kept at 100° C., polymerization was initiated at a stirring rotation speed of 100 rpm. After the polymerization was carried out for 60 minutes, 44 parts of styrene, 16 parts of acrylonitrile and 0.86 part of t-butyl peroxyisopropylmonocarbonate were continuously added over 3 hours. Four hours after the initiation of the polymerization, the internal temperature was raised to 120° C., and while the temperature was maintained, the reaction was further carried out for 2 hours before the polymerization was terminated. The polymerization conversion was 98%. Then, the inner temperature was cooled to 100° C., and 0.2 part of octadecyl-3-(3,5-di-tert-butyl-4-hydroxyphenol)-propionate was added. Then, the reaction liquid was taken out of the autoclave, and unreacted matters and solvents were removed therefrom by steam distillation. Thereafter, the resultant was pelletized using an extruder (at a cylinder temperature of 220° C., degree of vacuum of 760 mmHg) with a 40 mmϕ-screw and a vent while volatile components were substantially degassed. As a result, a rubber-reinforced aromatic vinyl resin (raw material P1) was obtained, which was a resinous mixture constituted by an ungrafted vinyl copolymer (acrylonitrile/styrene copolymer) and an ethylene/alpha-olefin rubber graft copolymer (graft resin) composed of a part of an ethylene/propylene copolymer rubber and a part of vinyl copolymer containing structural units originated from a vinyl cyanide compound (acrylonitrile) and structural units originated from an aromatic vinyl compound (styrene). The graft ratio of the graft resin (acetone-insoluble matter) contained in the raw material P1 was 48%.

The rubber content in the raw material P1, which was used for calculation of the graft ratio, was obtained from polymerization prescription and polymerization conversion. The content of the ungrafted vinyl copolymer (hereinafter, also referred to as "acetone-soluble matter") was 63%, provided that the whole raw material P1 was 100%. The limiting viscosity [η] (in methyl ethyl ketone, 30° C.) of the acetone-soluble matter was 0.42 dl/g. Melting point (Tm) of the raw material P1, which was then measured using this pellet, was 40° C.

1-2. Synthesis Example 2 (Synthesis of Raw Material P2 (AES Resin))

A 20 L-volume stainless steel autoclave equipped with a ribbon stirrer blade, an auxiliary agent-continuous adding device, a thermometer and the like was charged with 30 parts of an ethylene/propylene/dicyclopentadiene copolymer (ethylene/propylene/dicyclopentadiene=63/32/5(%), Moony viscosity (ML1+4, 100° C.)=33, no melting point (Tm), glass transition temperature (Tg)=−52° C.), 45 parts of styrene, 25 parts of acrylonitrile, 0.5 part of tert-dodecylmercaptane and 140 parts of toluene, and the internal temperature was raised to 75° C., followed by stirring the content in the autoclave for 1 hour to obtain a homogeneous solution. Thereafter, 0.45 part of tert-butylperoxyisopropyl monocarbonate was added, and the internal temperature was further raised. After the temperature reached 100° C., polymerization reaction was carried out at a stirring rotation speed of 100 rpm while the above temperature was maintained. Four hours after the initiation of the polymerization reaction, the internal temperature was raised to 120° C., and while the temperature was maintained, the reaction was further carried out for 2 hours before the polymerization reaction was terminated. Then, the inner temperature was cooled to 100° C., and 0.2 part of octadecyl-3-(3,5-di-tert-butyl-4-hydroxyphenol)-propionate was added. Then, the reaction liquid was taken out of the autoclave, and unreacted matters and solvents were removed therefrom by steam distillation. Thereafter, the resultant was pelletized using an extruder (at a cylinder temperature of 220° C., degree of vacuum of 760 mmHg) with a 40 mmϕ-screw and a vent while volatile components were substantially degassed. As a result, a rubber-reinforced aromatic vinyl resin (raw material P4) was obtained, which was a resinous mixture constituted by an ungrafted vinyl copolymer (acrylonitrile/styrene copolymer) and an ethylene/alpha-olefin rubber graft copolymer (graft resin) composed of a part of an ethylene/propylene/dicyclopentadiene copolymer rubber and a part of vinyl copolymer containing structural units originated from a vinyl cyanide compound (acrylonitrile) and structural units originated from an aromatic vinyl compound (styrene). The graft ratio of the graft resin (acetone-insoluble matter) contained in the raw material P4 was 60%. The rubber content in the raw material P4, which was used for calculation of the graft ratio, was obtained from polymerization prescription and polymerization conversion. The content of the acetone-soluble matter in the raw material P4 was 52%, provided that the whole raw material P4 was 100%. The limiting viscosity [η] (in methyl ethyl ketone, 30° C.) of the acetone-soluble matter was 0.45 dl/g. Melting point (Tm) of the raw material P4 was then measured using this pellet, but no melting point was found in the range of 0 to 120° C.

1-3. Synthesis Example 3 (Synthesis of Raw Material P3 (ABS Resin))

A glass flask equipped with a stirrer was charged under a nitrogen gas stream with 42 parts of ion-exchange water, 0.35 part of potassium rosinate, 0.2 part of tert-dodecylmercaptane, 80 parts of latex containing 32 parts of polybutadiene rubber (gel content: 80%) with an average particle diameter of 300 nm, 19 parts of latex containing 8 parts of styrene/butadiene copolymer rubber (styrene unit amount 30%) with an averaged particle diameter of 600 nm, 14 parts of styrene, and 6 parts of acrylonitrile, and the mixture was heated under stirring. At the time when the internal temperature reached 40° C., a solution in which 0.2 part of sodium pyrophosphate, 0.01 part of ferrous sulfate heptahydrate and 0.3 part of glucose were dissolved in 8 parts of ion-exchange water was added. Thereafter, 0.07 part of cumene hydroperoxide was added to initiate polymerization. After the polymerization was carried out for 30 minutes, further 45 parts of ion-exchange water, 0.7 part of potassium rosinate, 30 parts of styrene, 10 parts of acrylonitrile, 0.13 part of tert-dodecylmercaptane and 0.1 part of cumene hydroperoxide were continuously added over 3 hours. The polymerization was then continued for 1 hour and 0.2 part of 2,2'-methylene-bis(4-ethyl-6-tert-butylphenol) was added so as to complete the polymerization. Then, an aqueous sulfuric acid solution was added to the latex containing the reaction products so as to coagulate resinous components which were then washed with water. Then, the resinous components were washed and neutralized with an aqueous potassium hydroxide solution, and further washed with water and dried. As a result, a rubber-reinforced aromatic vinyl resin (raw material P5) was obtained, which was a resinous mixture constituted by an ungrafted vinyl copolymer (acrylonitrile/styrene copolymer) and a diene rubber graft copolymer (graft resin) composed of a part of a styrene/butadiene copolymer rubber and a part of vinyl copolymer containing structural units originated from a vinyl cyanide compound (acrylonitrile) and structural units originated from an aromatic vinyl compound (styrene). The graft ratio of the dienic rubbery polymer-reinforced aromatic vinyl resin (graft resin, acetone-insoluble matter) contained in the raw material P5 was 55%. The rubber content in the raw material P5, which was used for calculation of the graft ratio, was obtained from polymerization prescription and polymerization conversion. The content of the ungrafted (co)polymer (acetone-soluble matter) in the raw material P5 was 38%, provided that the whole raw material P5 was 100%. The limiting viscosity [η] (in methyl ethyl ketone, 30° C.) of the acetone-soluble matter was 0.45 dl/g. Meanwhile, no Melting point (Tm) of the raw material P5 was observed.

1-4. Synthesis Example 4 (Synthesis of Raw Material P4 (ASA Resin))

In a reaction vessel, 50 parts (as solid matter) of a latex with a solid content of 40% of an acrylic rubbery polymer (with a volume average particle diameter of 100 nm and a gel content of 90%) obtained by emulsion polymerization of 99 parts of n-butyl acrylate and 1 part of allylmethacrylate was placed, and further 1 part of sodium dodecylbenzene sulfonate and 150 parts of ion-exchanged water were placed for dilution. Then, the inside of the reaction vessel was purged with nitrogen, 0.02 part of ethylenediaminetetraacetic acid disodium salt, 0.005 part of ferrous sulfate and 0.3 part of sodium formaldehyde sulfoxylate were added thereto, and heated to 60° C. under stirring.

On the other hand, in a vessel, 1.0 part of terpinolene and 0.2 part of cumene hydroperoxide were dissolved in 50 parts of a mixture of 37.5 parts of styrene and 12.5 parts of acrylonitrile, and then the inside of the vessel was purged with nitrogen to obtain a monomer composition.

Next, the above monomer composition was polymerized at 70° C. whilst it was added to the above reaction vessel at a constant flow rate over 5 hours, to obtain latex. Magnesium sulfate was added to the latex to coagulate resinous components. Then, the resultant was washed with water and further dried to obtain an acrylic rubber graft copolymer (P4). The graft ratio thereof was 93% and the limiting viscosity [η] (at 30° C. in methyl ethyl ketone) was 0.30 dl/g. Meanwhile, there was no observed Tm of this raw material P4.

2. Raw Material [Q]

The following raw material Q1 was used as a thermoplastic resin that did not contain any part originated from rubbery polymers.

2-1. Raw Material Q1 (AS Resin)

An acrylonitrile/styrene copolymer which had proportions of acrylonitrile units and styrene units of 27% and 73%, respectively, and had a limiting viscosity [η] (at 30° C. in methyl ethyl ketone) of 0.30 dl/g was used. Glass transition temperature (Tg) was 103° C.

3. Raw Material [R]

3-1. Raw Material R1 (Polypropylene Resin)

A block type polypropylene "NOVATEC BC6C" (trade name) manufactured by Japan Polypropylene Corporation was used. The melting point measured by using DSC was 165° C.

4. Raw Material [S]

4-1. Raw Material S1 (Polyolefin Wax)

A polyethylene wax "SANWAX 171-P (trade name)" manufactured by Sanyo Chemical Industries, Ltd. was used. The number average molecular weight (Mn) was 1500, and the melting point measured by using DSC was 101° C.

4-2. Raw Material S2 (Silicone Oil)

A silicone oil "KF-54 (trade name)" manufactured by Shin-Etsu Silicone Co., Ltd. was used. The kinematic viscosity at 25° C. was 400 cSt.

Examples 1 to 15 and Comparative Examples 1 to 2

1. Production of Thermoplastic Resin Composition [X]

The raw materials [P], [Q], [R] and [S] shown in Table 1 were mixed together in a Henschel mixer in a proportion shown in Table 1. And then, the resultant mixture was melt-kneaded in a twin-screw extruder (a model "TEX44" manufactured by The Japan Steel Works, LTD.), at a barrel temperature of 230° C. to obtain pellets.

2. Evaluation of Plating Adhesion

The resin composition was molded to make a test piece of 150 mm length×90 mm width×3 mm thickness. Molding was performed using an injection molding machine IS170 manufactured by TOSHIBA MACHINE CO., LTD.

This test piece was immersed in a degreasing solution at 50° C. for 4-5 minutes, and then washed with pure water. Then, a mixture of sulfuric acid and chromic anhydride (98% sulfuric acid/chromic anhydride=400 g/L/400 g/L) was maintained at 68° C., and the test piece was immersed therein for 10 to 20 minutes, and then washed with pure water. Next, 10% hydrochloric acid aqueous solution was maintained at 23° C., and the test piece was immersed therein for 2 minutes, and then washed with pure water. Then, an aqueous solution consisting of palladium chloride, stannous chloride and hydrochloric acid was maintained at 20° C., and the test piece was immersed therein for 2 minutes, and then washed with pure water. Next, 10% sulfuric acid aqueous solution was maintained at 35° C., and the test piece was immersed therein for 3 minutes, and then washed with pure water. Then, an aqueous solution consisting of nickel sulfate, sodium citrate, sodium hypophosphite, ammonium chloride and ammonia water was maintained at 35 to 40° C., and the test piece was immersed therein for 5 minutes, and then washed with pure water, followed by wiping out moisture to obtain an electroless plated article. Then, this electroless plated test piece was dried at 80° C. for about 2 hours, and then an aqueous solution consisting of copper sulfate, sulfuric acid and a brightening agent was maintained at 20° C. The text piece was immersed therein at a current density of 3 A/dm$^2$ for 120 minutes to perform electroplating thereon, washed with pure water, dried at 80° C. for 2 hours and sufficiently dried at room temperature. An adhesive cellophane tape (manufactured by Nitto Denko Corporation) was affixed to the surface of the plating layer of the test piece, and then adhesion was evaluated according to the following criteria depending upon peeling state of the plating layer when the tape was peeled off. Meanwhile, the covering state of the electroless plated article was observed, and if it failed to be plated, the evaluation was then stopped, indicating the result as xx.

○: No peeling
Δ: Partial peeling
x: Overall peeling

Meanwhile, when plating adhesion is excellent, resin molded articles having uniform and beautiful plating appearance can be obtained without plating peeling off from the molded articles.

3. Evaluation of Impact Resistance 3-1. Snap-Fit Property Test

Figure 13A:
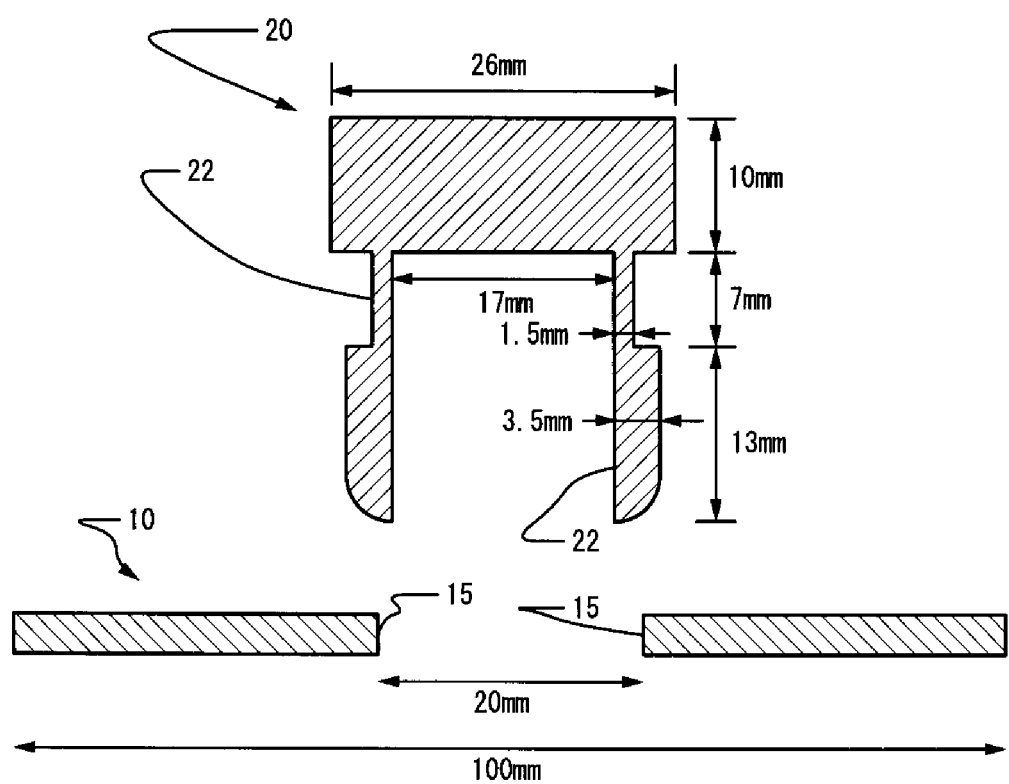
FIG. 13a is a schematic sectional view showing a snap-fit evaluation test piece used in the examples.
Figure 13B:
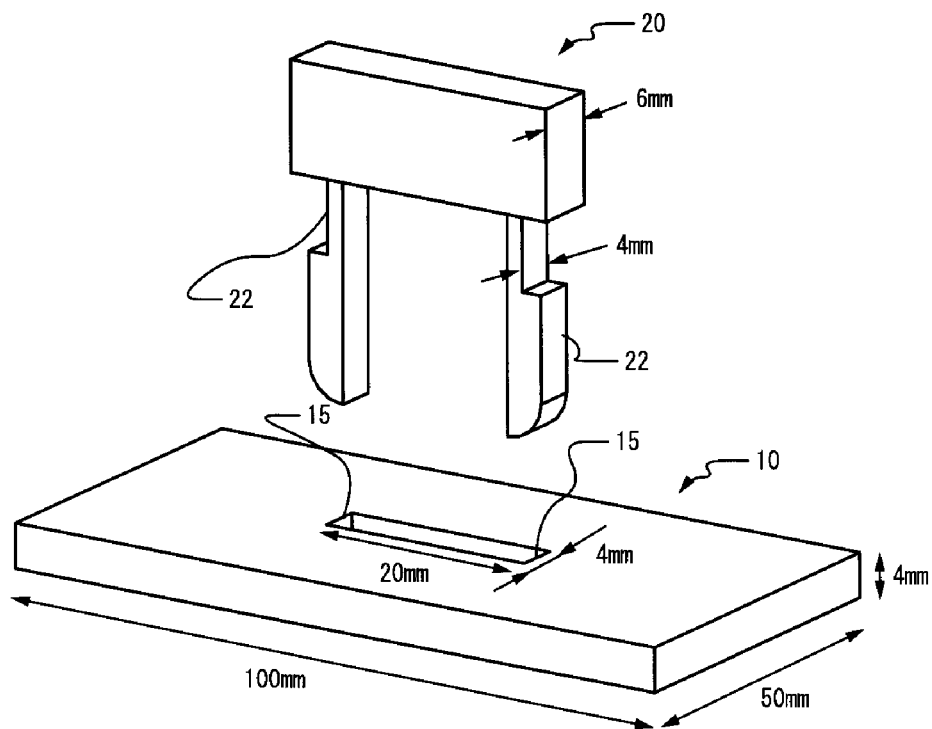

One hundred (100) pieces of specimen 20 for evaluation of snap-fit property, which were shaped, dimensioned and equipped with springs 22, 22 as shown in FIGS. 13a and 13b, were injection-molded from a thermoplastic resin composition shown in Table 1 under the conditions of a resin temperature of 230° C. and a metal mold temperature of 50° C. using an injection molding machine "J-100E" (model name) manufactured by THE JAPAN STEEL WORKS, LTD. Next, one hundred (100) pieces of plate 10 having a dimension of 100 mm×50 mm and 4 mm in thickness, which had a snap-fit hole of 20 mm×4 mm in the center thereof, were injection-molded from PC/ABS alloy "Excelloy CK20" (trade name) manufactured by Techno Polymer Co., Ltd. under the same conditions as above. Then, the entire surface (including the inner side surface of the snap-fit hole) of the plate 10 was plated in the same manner as in the above section 2. Thereafter, the springs 22, 22 of the specimen 20 were inserted into the snap-fit hole to evaluate whether any rupture or crack occurred in the specimen by the insertion. The evaluation was made in accordance with the following criteria.

<Evaluation of Snap-Fit Property>
○: Less than 5 pieces had rupture or crack until 100 pieces were tested.
Δ: Not less than 5 but less than 15 pieces had rupture or crack until 100 pieces were tested.
x: Not less than 15 pieces had crack until 100 pieces were tested.

4. Evaluation of Unpleasant Sound Suppression Effect
4-1. Evaluation of Squeaking Noise I (Before Thermal Aging)

Using an injection molding machine "J-100E" (model name) manufactured by THE JAPAN STEEL WORKS, LTD., five (5) ISO dumbbell test pieces made of a thermoplastic resin composition shown as Table 1 were injection-molded.

Next, as parts to be contacted, five (5) ISO dumbbell test pieces made of PC/ABS alloy "Excelloy CK20" (trade name) manufactured by Techno Polymer Co., Ltd. were injection-molded. Thereafter, plating was applied to the whole test pieces in the same way as the above plating adhesion test. Then, they were alternately stacked with the five (5) ISO dumbbell test pieces made of a thermoplastic resin composition shown as Table 1, and it was observed how squeaking noise occurred when the assembly was twisted by hands at the two ends thereof. The test was repeated five times, and the evaluation was made in accordance with the following criteria.

<Evaluation of Squeaking Noise>
○: In all five evaluations, the squeaking noise occurred slightly.
Δ: In five evaluations, the squeaking noise sometimes occurred obviously.
x: In all five evaluations, the squeaking noise occurred obviously.

4-2. Evaluation of Squeaking Noise II (after Thermal Aging)

Using an injection molding machine "J-100E" (model name) manufactured by THE JAPAN STEEL WORKS, LTD., five (5) ISO dumbbell test pieces made of a thermoplastic resin composition as shown in Table 1 were injection-molded. Thereafter, the test pieces were allowed to stand for 100 hours in a thermo-hygrostat chamber controlled to 80° C., 95% RH (wet heat treatment), and then cooled for 24 hours at 25° C.

Next, as parts to be contacted, five (5) ISO dumbbell test pieces made of PC/ABS alloy "Excelloy CK20" (trade name) manufactured by Techno Polymer Co., Ltd. were injection-molded. Thereafter, plating was applied to the whole test pieces in the same way as the above plating adhesion test. Thereafter, the test pieces were allowed to stand for 100 hours in a thermo-hygrostat chamber controlled to 80° C., 95% RH (wet heat treatment), and then cooled for 24 hours at 25° C. Then, they were alternately stacked with the five (5) ISO dumbbell test pieces formed of the thermoplastic resin composition shown as Table 1, and it was observed how squeaking noise occurred when the assembly was twisted by hands at the two ends thereof. The test was repeated five times, and the evaluation was made in accordance with the following criteria.

<Evaluation of Squeaking Noise>
○: In all five evaluations, the squeaking noise occurred slightly.
Δ: In five evaluations, the squeaking noise sometimes occurred obviously.
x: In all five evaluations, the squeaking noise occurred obviously.

4-3. Evaluation of Squeaking Noise III and IV (Noise Risk)

A thermoplastic resin composition was injection-molded by an injection molding machine "IS-170FA" (trade name) manufactured by Toshiba Machine Co., Ltd. at a cylinder temperature of 220° C., an injection pressure of 50 MPa and a metal mold temperature of 60° C. to thereby obtain a molded article having a length of 150 mm, a width of 100 mm and a thickness of 4 mm, from which a test piece having a length of 60 mm, a width of 100 mm and a thickness of 4 mm and a test piece having a length of 50 mm, a width of 25 mm and a thickness of 4 mm were then cut out by a disk saw. Then, the ends of the test pieces were chamfered by #100 sandpaper; and thereafter, fine burrs were removed by a cutter knife to thereby obtain two large and small sheets of the test pieces for squeaking noise evaluation.

The test pieces for evaluation were left in an oven bath regulated at 80° C.±5° C. for 300 hours, and thereafter cooled at 25° C. for 24 hours to thereby obtain thermally aged test pieces for evaluation. The resulting test pieces for evaluation, namely, two large and small sheets of molded articles were set on a stick-slip tester SSP-02 manufactured by ZINS Ziegler-Instruments GmbH, and the noise risk was measured when the test pieces were three times rubbed against each other with a swing of 20 mm at a temperature of 23° C., a humidity of 50% RH, a load of 5 N to 40 N and a velocity of 1 mm/sec to 10 mm/sec (Evaluation of squeaking noise IV). Also, a noise risk was measured by the same method as the above except that no thermal aging was carried out (Evaluation of squeaking noise III). The larger the noise risk is, the more easily squeaking noise occurs. Here, since the test pieces were thermally aged and then evaluated, the test method was made it possible to evaluate sustainability of the effect of reducing squeaking noise.

5. Melting Point (Tm)

According to JIS K 7121-1987, using a DSC (Differential Scanning calorimeter), an endothermic change was measured at a constant rate of temperature rise of 20° C. per minute, and the Tm was obtained from the peak temperature of the obtained endothermic pattern.

6. Weatherability

One hundred (100) parts of a composition was supplemented with 0.5 part of carbon black and 0.3 part of calcium stearate, and the resultant mixture was colored and kneaded in an extruder to obtain pellets. The pellets were injection-molded in an injection molding machine ("J-35AD" manufactured by THE JAPAN STEEL WORKS, LTD.) at a cylinder temperature of 220° C. and a metal mold temperature of 50° C. to obtain a piece of planar resinous molded article of 5 cm×8 cm and 2.4 mm in thickness. The molded article was exposed to raining cycles of 18 minutes and 120 minutes at a black panel temperature of 63° C. for 1000 hours using a sunshine weatherometer manufactured by Suga Test Instruments Co., Ltd. to calculate a change ΔE in color between before and after the exposure test. The case where the value ΔE is 3 or less was evaluated to be acceptable.

The value ΔE was obtained by measuring a color change degree Lab (L: lightness; a: redness; and b: yellowness) using a multi-spectro-color-meter manufactured by Suga Test Instruments Co., Ltd. and calculating in accordance with the following expression.

$$\Delta E = \sqrt{[(L_1-L_2)^2+(a_1-a_2)^2+(b_1-b_2)^2]}$$

(wherein $L_1$, $a_1$ and $b_1$ indicate a color before the exposure test, and $L_2$, $a_2$ and $b_2$ indicate a color after the exposure test.)

The lower the value $\Delta E$ is, the smaller the color change is, and the more excellent the tincture is.

7. Gloss

Gloss was measured using a piece of resinous molded article prepared in the same manner as in the above section 6, according to JIS K7105, using a digital gloss meter (model name "GM-26D", manufactured by Murakami Color Research Laboratory) at a measurement angle of 60 degree.

TABLE 1

| | Composition | | | Tm (□) | Examples | | | | | |
|---|---|---|---|---|---|---|---|---|---|---|
| | | | | | 1 | 2 | 3 | 4 | 5 | 6 |
| Thermoplastic resin composition [X] | Rubber-reinforced aromatic vinyl resin | Raw material [P] | P1 | 40 | 50 | 30 | 70 | 50 | 50 | — |
| | | | P2 | Null | — | — | — | — | — | 35 |
| | | | P3 | Null | 10 | 10 | 10 | 10 | 10 | 10 |
| | | | P4 | Null | — | — | — | — | — | — |
| | | Raw material [Q] | Q1 | Null | 40 | 60 | 20 | 40 | 40 | 55 |
| | Polypropylene resin | Raw material [R] | R1 | 165 | — | — | — | — | — | — |
| | Slidability imparting agent | Raw material [S] | S1 | 101 | — | — | — | 3 | — | — |
| | | | S2 | Null | — | — | — | — | 3 | — |
| | Rubber content (% by mass) (relative to [P] + [Q] + [R] = 100% by mass) | | | | 17 | 12 | 22 | 17 | 17 | 15 |
| | Proportion of rubbers (with respect to the total 100% by mass of the rubber part) | ethylene/α-olefin rubber | | | 76 | 65 | 81 | 76 | 76 | 72 |
| | | diene rubber | | | 24 | 35 | 19 | 24 | 24 | 28 |
| | | acrylic rubber | | | 0 | 0 | 0 | 0 | 0 | 0 |
| Evaluation | Melting point Tm (□) | | | | 40 | 40 | 40 | 40 and 101 | 40 | n/a |
| | Impact resistance (snap-fit) | | | | ○ | Δ | ○ | ○ | ○ | ○ |
| | Plating adhesion | | | | Δ | Δ | Δ | Δ | Δ | Δ |
| | Evaluation of squeaking noise I (before thermal aging) | | | | ○ | ○ | ○ | ○ | ○ | Δ |
| | Evaluation of squeaking noise II (after 100 hours thermal aging) | | | | ○ | ○ | ○ | ○ | ○ | Δ |
| | Evaluation of squeaking noise III (before thermal aging) | | | | 3≥ | 3≥ | 3≥ | 3≥ | 3≥ | 3≥ |
| | Evaluation of squeaking noise IV (after 300 hours thermal aging) | | | | 3≥ | 3≥ | 3≥ | 3≥ | 3≥ | 8 |
| | Weatherability | | | | ND | 2.5 | ND | ND | ND | ND |
| | Gloss | | | | ND | 90 | ND | ND | ND | ND |

| | Composition | | | Tm (□) | Examples | | | | | |
|---|---|---|---|---|---|---|---|---|---|---|
| | | | | | 7 | 8 | 9 | 10 | 11 | 12 |
| Thermoplastic resin composition [X] | Rubber-reinforced aromatic vinyl resin | Raw material [P] | P1 | 40 | — | — | — | 50 | 22 | 30 |
| | | | P2 | Null | 35 | — | — | — | 8 | — |
| | | | P3 | Null | 10 | 30 | 10 | 10 | 4 | 4 |
| | | | P4 | Null | — | — | 30 | — | 10 | 10 |
| | | Raw material [Q] | Q1 | Null | 55 | 70 | 60 | 20 | 56 | 56 |
| | Polypropylene resin | Raw material [R] | R1 | 165 | — | — | — | 20 | — | — |
| | Slidability imparting agent | Raw material [S] | S1 | 101 | 3 | 3 | 3 | — | — | — |
| | | | S2 | Null | — | — | — | — | — | — |
| | Rubber content (% by mass) (relative to [P] + [Q] + [R] = 100% by mass) | | | | 15 | 12 | 19 | 17 | 15 | 14 |
| | Proportion of rubbers (with respect to the total 100% by mass of the rubber part) | ethylene/α-olefin rubber | | | 72 | 0 | 0 | 76 | 54 | 53 |
| | | diene rubber | | | 28 | 100 | 21 | 24 | 11 | 11 |
| | | acrylic rubber | | | 0 | 0 | 79 | 0 | 34 | 35 |
| Evaluation | Melting point Tm (□) | | | | 101 | 101 | 101 | 40 and 165 | 40 | 40 |
| | Impact resistance (snap-fit) | | | | ○ | ○ | Δ | ○ | Δ | Δ |
| | Plating adhesion | | | | Δ | ○ | Δ | ○ | Δ | Δ |
| | Evaluation of squeaking noise I (before thermal aging) | | | | ○ | ○ | Δ | ○ | ○ | ○ |
| | Evaluation of squeaking noise II (after 100 hours thermal aging) | | | | ○ | ○ | × | ○ | ○ | ○ |
| | Evaluation of squeaking noise III (before thermal aging) | | | | 3≥ | 3≥ | 3≥ | 3≥ | 3≥ | 3≥ |

TABLE 1-continued

| | | | | | | | | |
|---|---|---|---|---|---|---|---|---|
| Evaluation of squeaking noise IV (after 300 hours thermal aging) | | | | 8 | 9 | 10 | 3≥ | 3≥ | 3≥ |
| Weatherability | | | | ND | ND | ND | ND | ND | 2.0 |
| Gloss | | | | ND | ND | ND | ND | ND | 93 |

| | | | | | Tm | Examples | | | Comparative Examples | |
|---|---|---|---|---|---|---|---|---|---|---|
| Composition | | | | | (□) | 13 | 14 | 15 | 1 | 2 |
| Thermoplastic resin composition [X] | Rubber-reinforced aromatic vinyl resin [P] | Raw material [P] | P1 | 40 | 22 | 10 | 100 | — | — |
| | | | P2 | Null | — | 20 | — | — | — |
| | | | P3 | Null | 4 | 4 | — | — | — |
| | | | P4 | Null | 18 | 10 | — | — | — |
| | | Raw material [Q] | Q1 | Null | 56 | 56 | — | 100 | — |
| | Polypropylene resin | Raw material [R] | R1 | 165 | — | — | — | — | 100 |
| | Slidability imparting agent [S] | Raw material [S] | S1 | 101 | — | — | — | — | — |
| | | | S2 | Null | — | — | — | — | — |
| | Rubber content (% by mass) (relative to [P] + [Q] + [R] = 100% by mass) | | | | 16 | 15 | 25 | 0 | 0 |
| | Proportion of rubbers (with respect to the total 100% by mass of the rubber part) | ethylene/α-olefin rubber | | | 34 | 56 | 100 | 0 | 0 |
| | | diene rubber | | | 10 | 11 | 0 | 0 | 0 |
| | | acrylic rubber | | | 56 | 33 | 0 | 0 | 0 |
| Evaluation | Melting point Tm (□) | | | | 40 | 40 | 40 | n/a | 165 |
| | Impact resistance (snap-fit) | | | | Δ | Δ | Δ | x | ○ |
| | Plating adhesion | | | | Δ | Δ | Δ | xx | xx |
| | Evaluation of squeaking noise I (before thermal aging) | | | | ○ | Δ | ○ | *1 | *1 |
| | Evaluation of squeaking noise II (after 100 hours thermal aging) | | | | ○ | x | ○ | *1 | *1 |
| | Evaluation of squeaking noise III (before thermal aging) | | | | 3≥ | 3≥ | 3≥ | *1 | *1 |
| | Evaluation of squeaking noise IV (after 300 hours thermal aging) | | | | 3≥ | 9 | 3≥ | *1 | *1 |
| | Weatherability | | | | 1.7 | ND | 1.0 | ND | ND |
| | Gloss | | | | 95 | ND | 80 | ND | ND |

Note:
*1: Plating was impossible, and the subsequent evaluation was not made.
ND: Not determined.

The followings are clarified from Table 1.

Examples 1 to 15 using the thermoplastic resin composition [X] of the present invention were excellent in plating adhesion and impact resistance. Examples 1 to 5, 10 to 13 and 15, in which the rubber-reinforced aromatic vinyl resin contained a certain amount or more of the ethylene/alpha-olefin rubber having a melting point, were further excellent in the suppression of occurrence of unpleasant sounds. In addition, Examples 12 and 13, in which the rubber-reinforced aromatic vinyl resin contained certain amounts or more of the ethylene/alpha-olefin rubber and the acrylic rubber, were also excellent in weatherability.

Among them, Example 13 with a high percentage of the acrylic rubber was particularly excellent in gloss.

On the other hand, Comparative Examples 1 and 2 using a thermoplastic resin composition that did not contain the component (A) was impossible to apply plating and could not be evaluated afterwards.

Comparative Example 3

Five (5) ISO dumbbell test pieces formed of the thermoplastic resin composition described in Example 1 of Table 1 were injection-molded, and plating was applied to the whole test pieces in the same way as the above plating adhesion test. Thereafter, the test pieces were allowed to stand for 300 hours in a thermo-hygrostat chamber controlled to 80° C., 95% RH (wet heat treatment).

Next, ISO dumbbell test pieces formed of PC/ABS alloy "Excelloy CK20" (trade name) manufactured by Techno Polymer Co., Ltd. were injection-molded. Thereafter, plating was applied to the whole test pieces in the same way as the above plating adhesion. Thereafter, the test pieces were allowed to stand for 300 hours in a thermo-hygrostat chamber controlled to 80° C., 95% RH (wet heat treatment), and then cooled for 24 hours at 25° C. Then, they were alternately stacked with the five (5) ISO dumbbell test pieces formed of the thermoplastic resin composition shown as Table 1, and the assembly was twisted by hands at the two ends thereof one hundred (100) times. Thereafter, when the plated surfaces that were brought into contact with the above parts were observed, very fine scratches were found to occur on the plated surfaces.

Example 16

Evaluation was made in the same manner as in Comparative Example 3, except that ISO dumbbell test pieces that were formed of the thermoplastic resin composition described in Example 1 of Table 1 but free from plating were used. The plated surfaces of the ISO dumbbell test pieces formed of the PC/ABS alloy "Excelloy CK20" (trade name) were maintained to be beautiful in appearance without any fine scratch.

In the case of an article in which components contacting with each other are operated to be separated from each other, it is problematic that scratches occur on the plated surface as in Comparative Example 3 since appearance degrades at or adjacent to contact portions. However, such a defect did not occur in the Examples according to the present invention.

INDUSTRIAL APPLICABILITY

The present invention relates to an article which at least comprises two components contacting with each other, and is excellent in impact resistance and appearance and is further suppressed in occurrence of unpleasant sounds such as squeaking noise even when at least one of the two components is plated, and thus can suitably be utilized for producing articles that are required to have a design enhanced by plating.

EXPLANATION OF SYMBOLS 10 first article
11 resinous molded article
13 plating
15 contact portion
20 second article
21 resinous molded article
23 plating
25 contact portion

The invention claimed is:

1. An article at least comprising two components contacting with each other, at least part of a surface of each of the two components being plated, in which at least one of the two component comprises a portion that contacts with the plated portion of the other component, said portion being at least partly formed of a thermoplastic resin composition (X) comprising a rubber-reinforced aromatic vinyl resin (A), in which the thermoplastic resin composition (X) has a melting point in a range of 0 to 130° C. as measured in accordance with JIS K 7121-1987 and the rubber-reinforced aromatic vinyl resin (A) has a rubber part made from an ethylene/alpha-olefin rubber.

2. The article according to claim 1, in which at least one of the two components is formed of the thermoplastic resin composition (X) as a whole or at the whole portion that contacts with the other component.

3. The article according to claim 1, in which the thermoplastic resin composition (X) has a rubber content of 3 to 60% by mass.

4. The article according to claim 1, in which the ethylene/alpha-olefin rubber has a melting point in a range of 0 to 130° C. as measured in accordance with JIS K 7121-1987.

5. An article at least comprising two components contacting with each other, at least part of a surface of each of the two components being plated, in which at least one of the two component comprises a portion that contacts with the plated portion of the other component, said portion being at least partly formed of a thermoplastic resin composition (X) comprising a rubber-reinforced aromatic vinyl resin (A), in which the thermoplastic resin composition (X) comprises a slidability imparting agent.

6. The article according to claim 5, in which the slidability imparting agent is at least one selected from the group consisting of low molecular weight polyolefin wax and silicone oil.

7. The article according to claim 1, in which the thermoplastic resin composition (X) further comprises a polypropylene resin.

8. The article according to claim 1, in which the two components contact with each other by snap-fit.

9. A component for constituting an article that at least comprises two components contacting with each other, at least part of a surface of each of the two components being plated, which comprises a portion that contacts with the plated portion of the other component, said portion being at least partly formed of a thermoplastic resin composition (X) comprising a rubber-reinforced aromatic vinyl resin (A), in which the thermoplastic resin composition (X) has a melting point in a range of 0 to 130° C. as measured in accordance with JIS K 7121-1987 and the rubber-reinforced aromatic vinyl resin (A) has a rubber part made from an ethylene/alpha-olefin rubber.

10. An article at least comprising two components contacting with each other, at least part of a surface of one of the two components being plated, in which the other of the two components comprises a portion that contacts with the plated portion of the one component, said portion being at least partly formed of a thermoplastic resin composition (X) comprising a rubber-reinforced aromatic vinyl resin (A), and said thermoplastic resin composition (X) having a noise risk of 3 or less, in which the thermoplastic resin composition (X) has a rubber content of 3 to 60% by mass, the thermoplastic resin composition (X) has a melting point in a range of 0 to 130° C. as measured in accordance with JIS K 7121-1987, and the rubber-reinforced aromatic vinyl resin (A) has a rubber part made from an ethylene/alpha-olefin rubber.

11. The article according to claim 10, in which the other component is formed of the thermoplastic resin composition (X) as a whole or at the whole portion that contacts with the one component.

12. The article according to claim 10, in which the ethylene/alpha-olefin rubber has a melting point in a range of 0 to 130° C. as measured in accordance with JIS K 7121-1987.

13. An article at least comprising two components contacting with each other, at least part of a surface of one of the two components being plated, in which the other of the two components comprises a portion that contacts with the plated portion of the one component, said portion being at least partly formed of a thermoplastic resin composition (X) comprising a rubber-reinforced aromatic vinyl resin (A), and said thermoplastic resin composition (X) having a noise risk of 3 or less, in which the thermoplastic resin composition (X) comprises a slidability imparting agent.

14. The article according to claim 13, in which the slidability imparting agent is at least one selected from the group consisting of low molecular weight polyolefin wax and silicone oil.

15. The article according to claim 12, in which the rubber part of the rubber-reinforced aromatic vinyl resin (A) comprises:
  50 to 80% by mass of an ethylene/alpha-olefin rubber, and 20 to 50% by mass of a diene rubber, provided that the total of the two rubbers is 100% by mass; or
  20 to 90% by mass of an ethylene/alpha-olefin rubber, 1 to 56% by mass of a diene rubber, and 5 to 68% by mass of an acrylic rubber, provided that the total of the three rubbers is 100% by mass.

16. The article according to claim 10, in which the thermoplastic resin composition (X) further comprises a polypropylene resin.

17. The article according to claim 15, in which the one component is formed of the same thermoplastic resin composition (X) as the other component.

18. The article according to claim 17, in which the two components contact with each other by snap-fit.

19. A component for constituting an article that at least comprises two components contacting with each other, at least part of a surface of one of the two components being plated, which comprises a portion which contacts with the plated portion of the one component, said portion being at least partly formed of a thermoplastic resin composition (X) comprising a rubber-reinforced aromatic vinyl resin (A), in which the thermoplastic resin composition (X) comprises a slidability imparting agent.

* * * * *